US012625742B2

(12) United States Patent
Sethi et al.

(10) Patent No.: US 12,625,742 B2
(45) Date of Patent: May 12, 2026

(54) METHOD AND SYSTEM FOR MANAGING LOADS ACROSS MULTIPLE GEOGRAPHICALLY DISPERSED DATA CLUSTERS

(71) Applicant: Dell Products L.P., Round Rock, TX (US)

(72) Inventors: Parminder Singh Sethi, Ludhiana (IN); Anay Kishore, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 502 days.

(21) Appl. No.: 18/304,848

(22) Filed: Apr. 21, 2023

(65) Prior Publication Data

US 2024/0354171 A1      Oct. 24, 2024

(51) Int. Cl.
*G06F 9/46* (2006.01)
*G06F 9/50* (2006.01)

(52) U.S. Cl.
CPC .......... *G06F 9/5083* (2013.01); *G06F 9/5072* (2013.01); *G06F 2209/501* (2013.01); *G06F 2209/5016* (2013.01); *G06F 2209/502* (2013.01); *G06F 2209/503* (2013.01); *G06F 2209/505* (2013.01)

(58) Field of Classification Search
CPC ................. G06F 9/5083; G06F 9/5072; G06F 2209/501; G06F 2209/5016; G06F 2209/502; G06F 2209/503; G06F 2209/505
See application file for complete search history.

(56) References Cited

U.S. PATENT DOCUMENTS

| | | | |
|---|---|---|---|
| 7,590,981 B2 | 9/2009 | Gupta et al. | |
| 8,078,448 B1 | 12/2011 | Wohlberg et al. | |
| 8,505,106 B1 | 8/2013 | Bhosle et al. | |
| 10,574,699 B1 * | 2/2020 | Baer ................... | G06F 21/6218 |
| 11,133,933 B1 * | 9/2021 | Grund ................ | G06F 16/2471 |
| 12,411,720 B2 * | 9/2025 | Lu .......................... | G06F 9/4875 |

(Continued)

FOREIGN PATENT DOCUMENTS

| | | | |
|---|---|---|---|
| CN | 103327002 B | 4/2016 | |
| CN | 112231074 A * | 1/2021 | ........... G06F 9/4881 |

OTHER PUBLICATIONS

Dacosta, Italo, et al., One-time cookies: Preventing session hijacking attacks with stateless authentication tokens, 1-24, 2012 (24 pages).

(Continued)

*Primary Examiner* — Diem K Cao
(74) *Attorney, Agent, or Firm* — Chamberlain, Hrdlicka, White, Williams & Aughtry; Aly Z. Dossa

(57) ABSTRACT

A method for managing loads in data clusters includes: identifying, by a first load management module (LMM) of a first data cluster, a load performance decline event associated with the first data cluster; in response to identifying the load performance decline event: selecting a second LMM associated with a second data cluster, wherein the second LMM is associated with an authenticated connection with the first LMM; sending requests to the second LMM using a secure string identifier associated with the authenticated connection, wherein the LMM services the requests using the second data cluster.

16 Claims, 9 Drawing Sheets

(56)                    References Cited

U.S. PATENT DOCUMENTS

| | | | |
|---|---|---|---|
| 2010/0077216 A1 | 3/2010 | Kramer et al. | |
| 2010/0088752 A1 | 4/2010 | Nagulakonda et al. | |
| 2011/0113224 A1 | 5/2011 | Isshiki et al. | |
| 2012/0166401 A1 | 6/2012 | Li | |
| 2013/0073692 A1 | 3/2013 | Isaza et al. | |
| 2015/0089604 A1 | 3/2015 | Mathew et al. | |
| 2015/0278219 A1 | 10/2015 | Phipps | |
| 2016/0162280 A1 | 6/2016 | Murayama et al. | |
| 2017/0041144 A1 | 2/2017 | Krapf et al. | |
| 2018/0113728 A1 | 4/2018 | Musani et al. | |
| 2019/0372962 A1 | 12/2019 | Maria et al. | |
| 2020/0156243 A1 | 5/2020 | Ghare et al. | |
| 2020/0244463 A1 | 7/2020 | Wilson | |
| 2021/0232440 A1* | 7/2021 | Ranjan | G06F 9/5005 |
| 2022/0247802 A1 | 8/2022 | Broberg et al. | |
| 2023/0315496 A1 | 10/2023 | Cravens | |
| 2024/0202725 A1 | 6/2024 | Anapliotis et al. | |
| 2024/0419771 A1 | 12/2024 | Nussbaum | |

OTHER PUBLICATIONS

Curtis R. Taylor et al., Validating security protocols with cloud-based middleboxes, Conference on Communications and Network Security (CNS). IEEE, 2016, (9 pages).
NPL Search Terms, PE2E Search—Search History (Prior Art), Mar. 31, 2025 (17 pages).

* cited by examiner

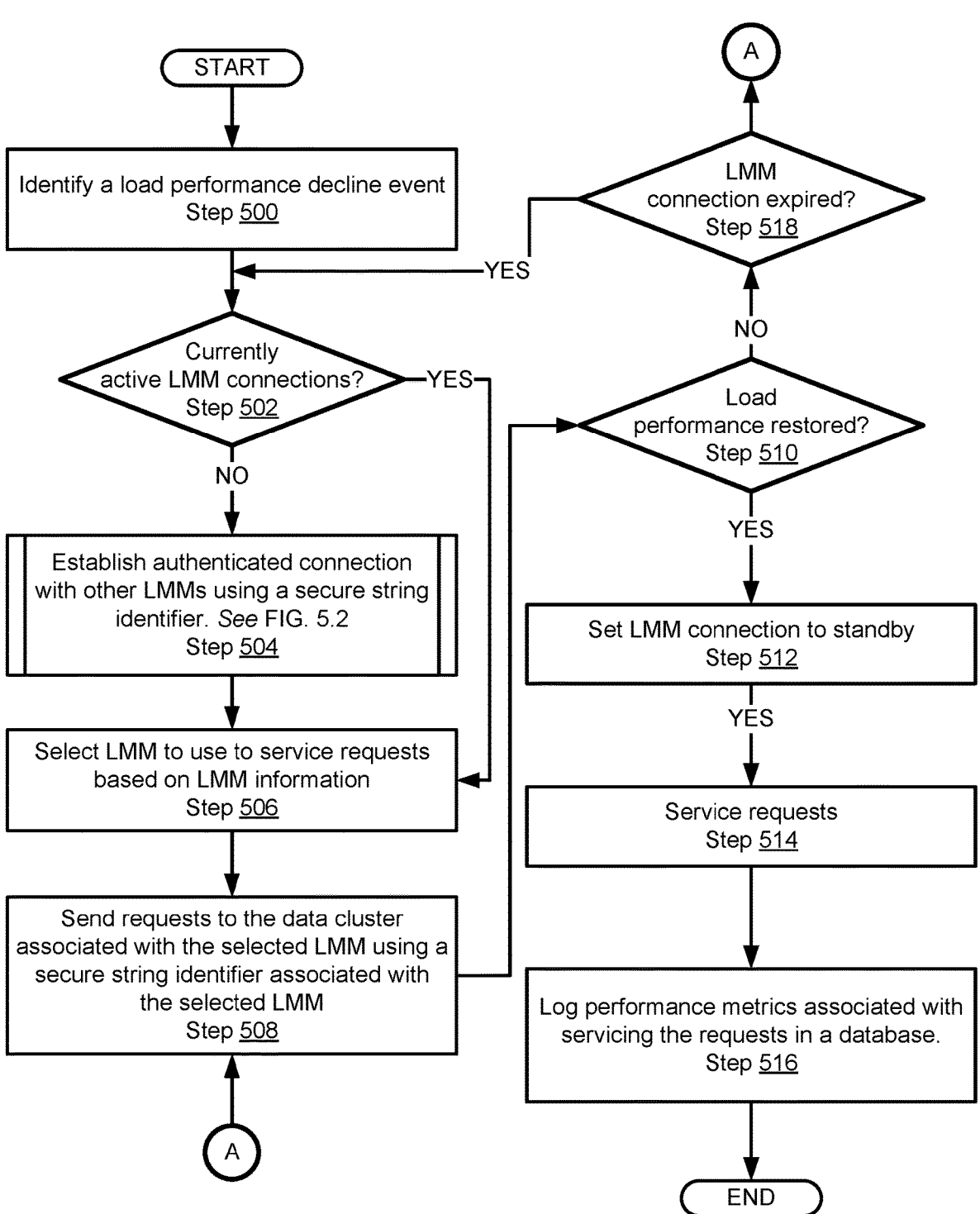
FIG. 5.1

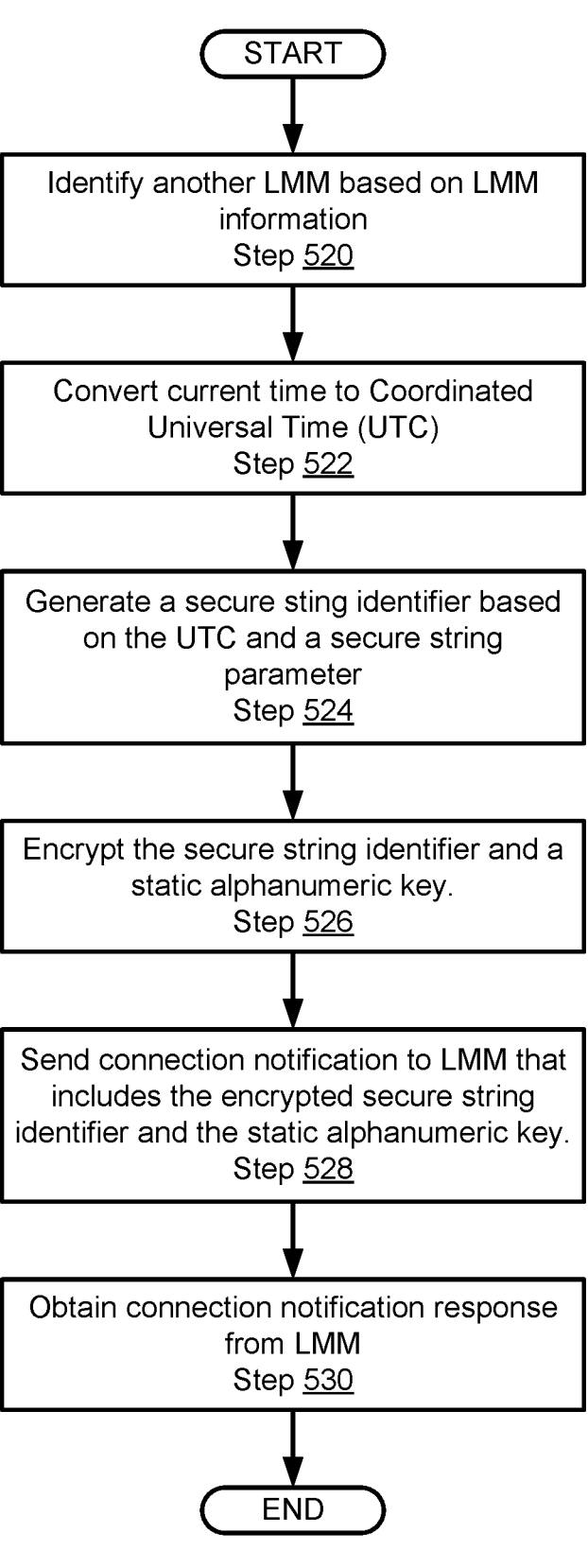
FIG. 5.2

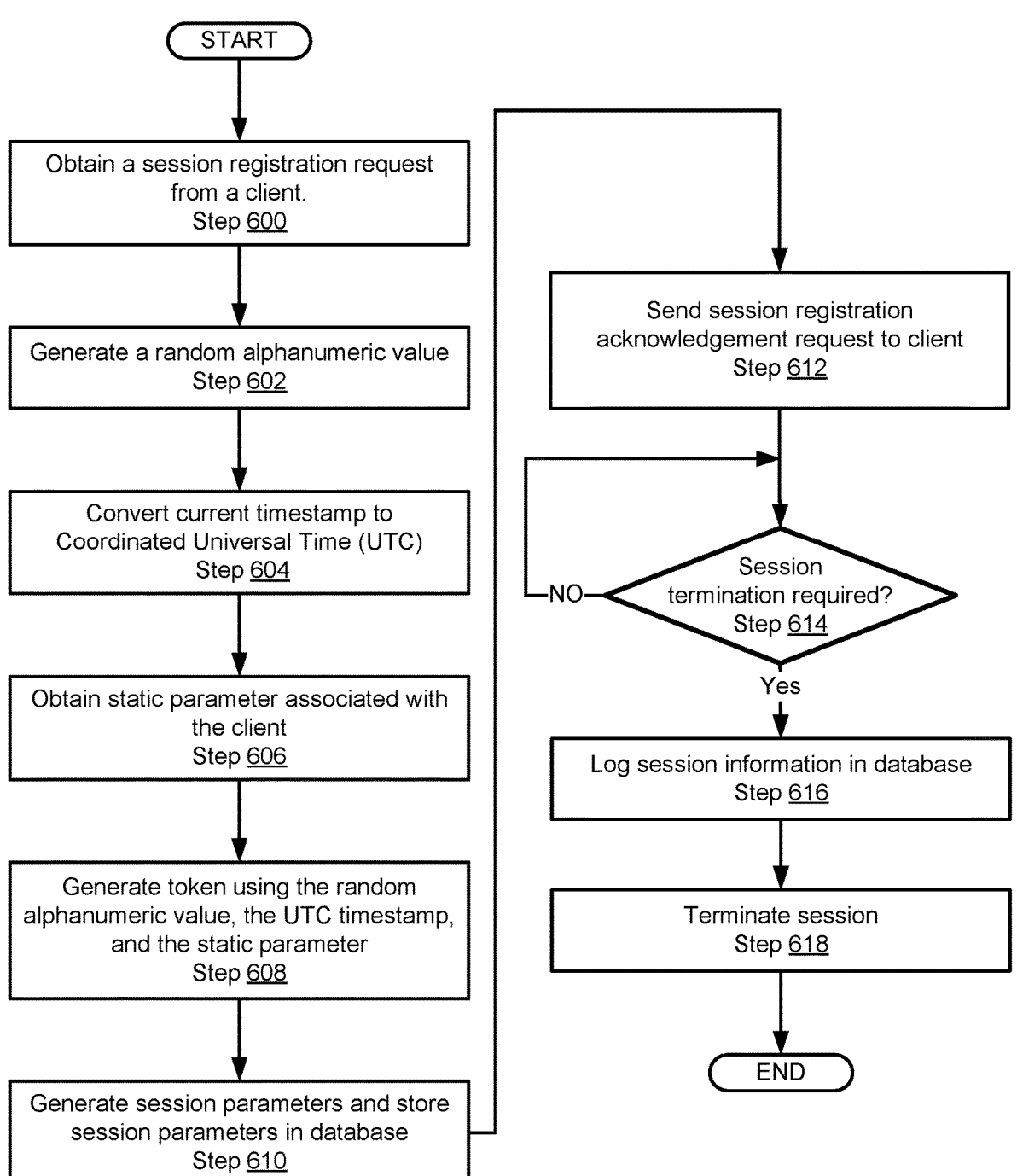
FIG. 6.1

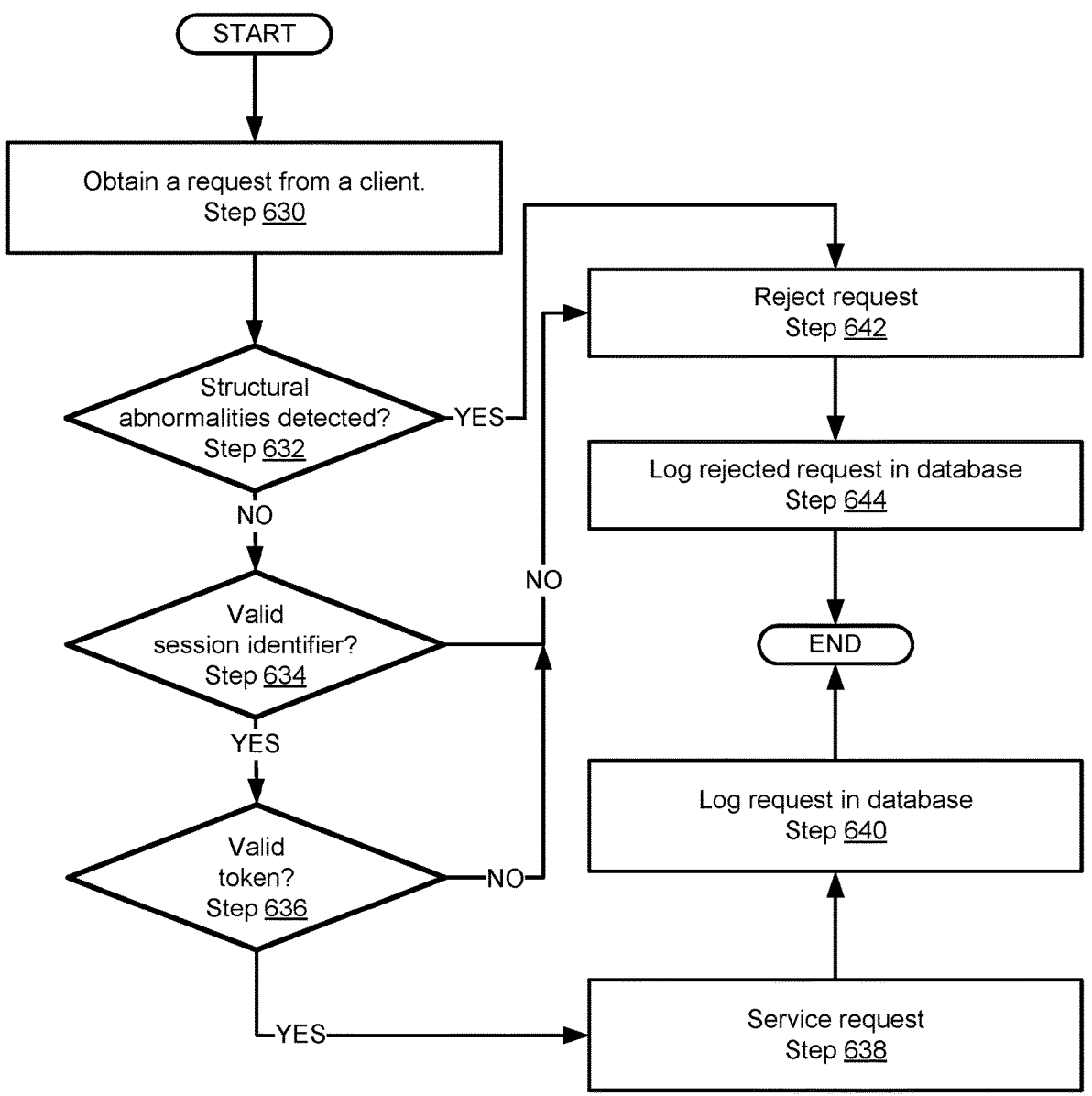
FIG. 6.2

700

METHOD AND SYSTEM FOR MANAGING LOADS ACROSS MULTIPLE GEOGRAPHICALLY DISPERSED DATA CLUSTERS

BACKGROUND

Computing devices may provide services. To provide the services, the computing devices may include hardware components and software components. The software components may store information usable to provide the services using the hardware components. That information may be transmitted to other computing devices to perform other services.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 5.1 shows a flowchart of a method for performing load management services in accordance with one or more embodiments of the invention.

FIG. 5.2 shows a flowchart of a method for establishing an authenticated connection in accordance with one or more embodiments of the invention.

FIG. 6.1 shows a flowchart of a method for establishing a secure session in accordance with one or more embodiments of the invention.

FIG. 6.2 shows a flowchart of a method for verifying a request in accordance with one or more embodiments disclosed herein.

DETAILED DESCRIPTION

Figure 1:
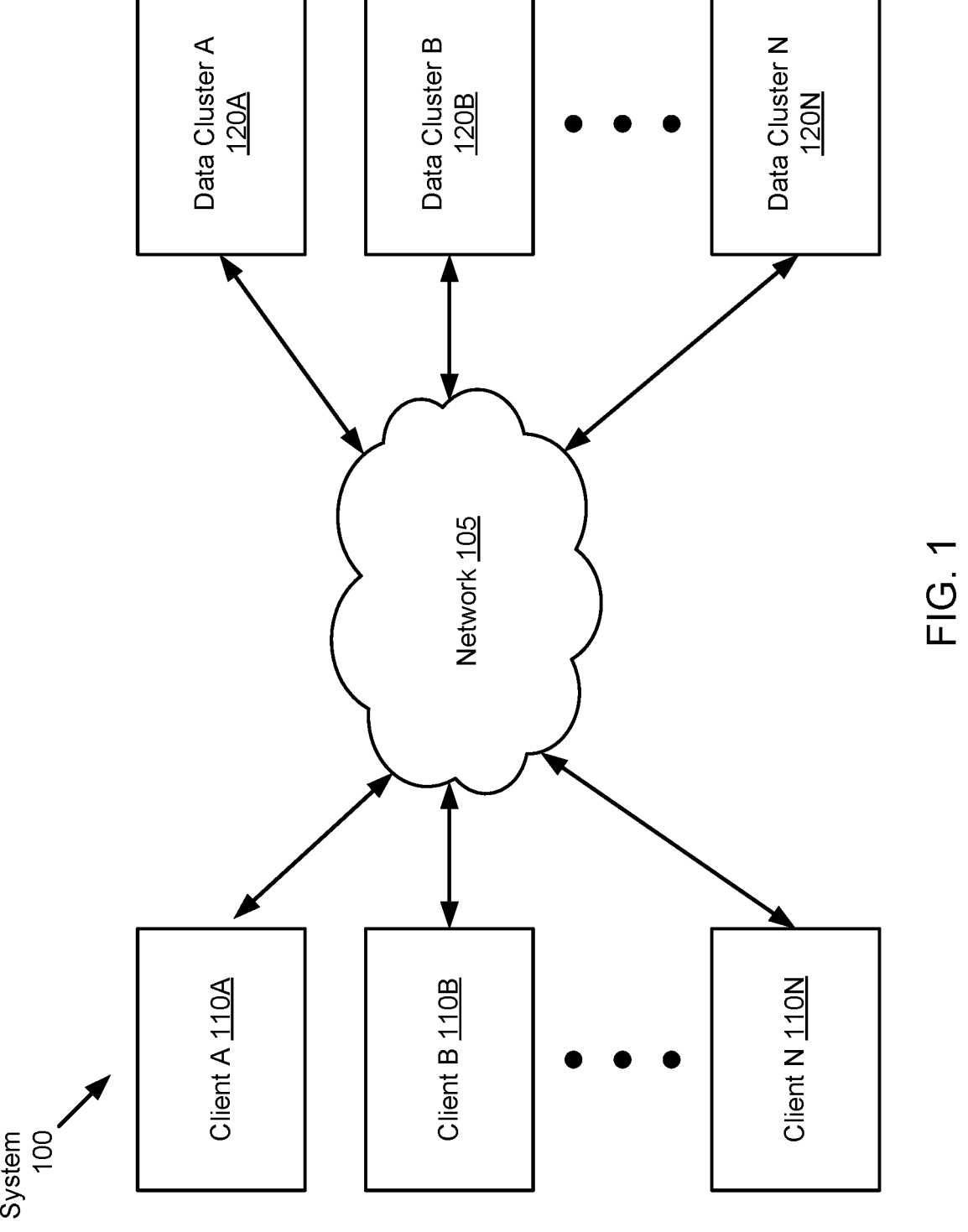
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a SAN infrastructure is utilized to store various different types of data (e.g., business-critical information, implementation details, information subject to government regulations, etc.) that an organization (e.g., a corporate) might need for, for example, developing long-term strategies. As organizations reaching out different geographical regions of the world with their diversified business models, and because of the increased demand for data availability, integrity, and reliability, (i) the need for diversifying data clusters of those organizations and applications executing on them arises, and (ii) the need for maintaining storage availability and security becomes a priority.

Embodiments disclosed herein may address, at least in part, the aforementioned issues. More specifically, embodiments disclosed herein may solve this problem in four parts. First, embodiments disclosed herein may include systems monitoring and identification of different types of bottlenecks. In one or more embodiments, user configurations and system identification processes may be used to understand underlying hardware and software stacks to generate rulesets to identify the bottlenecks in the system. Second, embodiments disclosed herein may include securely sharing the load between multiple sites (e.g., datacenters or data clusters). In one or more embodiments, an adapter may be installed on all sites. These adapters may communicate with each other and may be used to obtain or provide assistance from or to other sites. Third, embodiments disclosed herein may improve the predictability of failure using self-learning or machine learning. In one or more embodiments, the aforementioned adapters may include a self-learning module that may keep track of different types of performance issues and may forecast or predict any such issues that might happen. Fourth, embodiments disclosed herein may also include a reporting console. In one or more embodiments, the reporting console may be a command-based console running within the system as a module to provide issues about the history of performance issues and forecasts from learning module to the user or other entities.

Additionally, embodiments disclosed herein may also include an application (e.g., a security module) which may be deployed in a user's datacenter (e.g., data cluster) and may be able to monitor data cluster hardware with set parameters and filter all inbound and outbound network traffic in the data cluster and reject invalid and potentially malicious requests using TCP request analysis.

The following describes various embodiments of the invention.

FIG. 1 shows a diagram of a system (100) in accordance with one or more embodiments of the invention. The system (100) includes one or more clients (e.g., Client A (110A), Client B (110B), etc.), a one or more data clusters (e.g., data cluster A (120A), data cluster B (120B), data cluster N (120N), etc.), and a network (105). The system (100) may include additional, fewer, and/or different components without departing from the scope of the invention. Each component may be operatively connected to any of the other components via any combination of wired and/or wireless connections. Each component illustrated in FIG. 1 is discussed below.

In one or more embodiments, the clients (e.g., 110A, 110B, 110N, etc.), the data cluster (120), and the network (105) may be physical or logical devices, as discussed below. Each client (e.g., 110A) may be operatively connected to one or more data clusters (e.g., 120A, 120B, 120N) via the network (105), in which the network (105) may allow each client (and its hardware and software components (not shown) to communicate with the data clusters (e.g., 120A, 120B, 120N) (e.g., to communicate with the components of the data cluster (e.g., 120A)). In one or more embodiments, a firewall, a load management module, a security module, one or more servers, a network device, and a SAN infrastructure that are deployed to a data cluster (e.g., 120A) may collectively be referred to as "components of the data cluster (e.g., 120A).

While FIG. 1 shows a specific configuration of the system (100), other configurations may be used without departing from the scope of the invention. For example, although Client A (110A) and data cluster A (120A) are shown to be operatively connected through the network (105), Client A (110A) and data cluster A (120A) may be directly connected, without an intervening network (e.g., 105).

Further, the functioning of the clients (e.g., 110A, 110B, 110N, etc.) and the data clusters (e.g., 120A, 120B, 120N) is not dependent upon the functioning and/or existence of the other components (e.g., devices) in the system (100). Rather, the clients (e.g., 110A, 110B, etc.) and the data cluster (e.g., 120A, 120B, 120N) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. Further, as used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may deliver computing power, storage capacity, and data protection (e.g., software-defined data protection) as a service to users of the clients (e.g., 110A, 110B, etc.). The system (100) may also represent a comprehensive middleware layer executing on computing devices (e.g., 500, FIG. 5) that supports virtualized application environments. In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, as being a physical computing device or a logical computing device (e.g., a VM), the data clusters (e.g., 120A, 120B, 120N) may be configured for hosting and maintaining various workloads, and/or for providing a computing environment (e.g., computing power and storage) whereon workloads may be implemented. In general, a data cluster's (e.g., 120A, 120B, 120N) (e.g., a site's, a node's, etc.) infrastructure is based on a network of computing and storage resources that enable the delivery of shared applications and data. For example, the data cluster (e.g., 120A) of an organization may exchange data with other data clusters (e.g., 120B, 120N) of the same organization registered in/to the network (105) in order to, for example, participate in a collaborative workload placement. As yet another example, the data cluster (e.g., 120A) may split up or forward a request (e.g., an operation, a task, an activity, etc.) with or to another data cluster (e.g., 120B), coordinating or passing its efforts to complete or service the request (e.g., to generate a response) more efficiently than if the data cluster (e.g., 120A) had been responsible for completing the request. One of ordinary skill will appreciate that the data clusters (e.g., 120A, 120B, 120N) may perform other functionalities without departing from the scope of the invention.

In one or more embodiments, the data clusters (e.g., 120A, 120B, 120N) may be capable of providing the aforementioned functionalities/services to the user of the clients (e.g., 110A, 110B, etc.). However, not all of the users may be allowed to receive all of the services. For example, the priority (e.g., the user access level) of a user may be used to determine how to manage computing resources within the data clusters (e.g., 120A, 120B, 120N) to provide services to that user. As yet another example, the priority of a user may be used to identify the services that need to be provide to that user. As yet another example, the priority of a user may be used to determine how quickly communications (for the purposes of providing services in cooperation with the network (105) (and its subcomponents)) are to be processed by the network (105).

Further, consider a scenario where a first user is to be treated as a normal user (e.g., a user with a user access level of $4/10$). In such a scenario, the user level of that user may indicate that certain ports (of the subcomponents of the network (105)) are to be opened, other ports are to be blocked so that (i) certain services are to be provided to the user by a data cluster (e.g., 120A) and (ii) network traffic from that user is to be afforded a normal level of quality (e.g., a normal processing rate). In contrast, a second user may be determined to be a high priority user (e.g., a user with a user access level of $9/10$). In such a case, the user level of that user may indicate that more ports are to be opened than were for the first user so that (i) the data cluster (e.g., 120A) may provide more services to the second user and (ii) network traffic from that user is to be afforded a high level of quality (e.g., a higher processing rate than the traffic from the normal user).

As used herein, "network traffic" is an amount of data moving across a network (e.g., 105) at any given time. For example, in search engine optimization, network traffic may be characterized as being either direct, organic, or paid, in which (i) direct network traffic may be initiated when a user types a website's uniform resource locator (URL) in a web browser (e.g., a computer program for displaying and navigating between web pages), (ii) organic network traffic may be initiated when a user uses a search engine of a web browser to locate information in web pages, and (iii) paid network traffic may be initiated when a user clicks on an advertisement on a web page.

As yet another example, in data cluster administration, network traffic may be characterized as either being north-south or east-west, in which (i) north-south network traffic may be client-to-server network traffic that operates between a client and a server and (ii) east-west network traffic may be server-to-server network traffic that operates between servers within a data cluster.

In one or more embodiments, the data clusters (e.g., 120A, 120B, 120N) may include, for example (but not limited to): a router, a switch, a firewall, a load management module, a security module, a SAN infrastructure, a server, an application-delivery controller, a network device, etc. The data clusters (e.g., 120A, 120B, 120N) may support business application and activities (e.g., actions, behaviors, etc.) that include, for example (but not limited to): email and asset (e.g., a file, a folder, etc.) sharing, one or more production workloads, customer relationship management, enterprise resource planning, artificial intelligence (AI)/machine learning (ML)-based activities, virtual desktop infrastructure (VDI) environments, collaboration services, etc.

In one or more embodiments, the components (described above) of the data cluster (120) provide, at least, (i) network infrastructure (which connects servers (physical and/or virtualized), data cluster services, storage, and external connectivity to end-user locations (e.g., 110A, 110B, etc.)), (ii) storage infrastructure (e.g., the SAN infrastructure (210)), and (iii) computing resources (e.g., processing, memory, local storage, network connectivity, etc.) that drive applications.

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, an "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer (e.g., to determine) SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

In one or more embodiments, the wrong (or sub-optimal) selection of a target device may (i) result in generating an over-utilized or under-utilized target device and (ii) unnecessarily delay a backup (or replication) operation window.

As used herein, the term "backup" is intended to be broad in scope. In this manner, example backups in connection with which embodiments of the invention may be employed include (but not limited to): full backups, partial backups, clones, replications, snapshots, incremental backups, differential backups, etc.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS makes a container lightweight, fast, and portable.

Further, comparing to a conventional data cluster scenario, in which (i) all the necessary hardware and software components are needed to be acquired and (ii) an entire infrastructure team is needed to build and configure all aspects of the infrastructure (which may take weeks), the above process may take only minutes with containers. Containers may also include functionality to: (i) perform disaster recovery (with this functionality, even if multiple containers fail, applications may continue to execute uninterrupted), (ii) perform seamless scaling up and down with little to no intervention on the part of a user (with this functionality, as demand grows, containers may eliminate the need to add more servers or allocate more resources in a costly way), and (iii) reduce labor-intensive efforts and costs, in which containers may require very few personnel to manage and monitor applications and instances. One of ordinary skill will appreciate that containers may perform other functionalities without departing from the scope of the invention.

As used herein, a "file system" is a method that an OS (e.g., Microsoft® Windows, Apple® MacOS, etc.) uses to control how data is named, stored, and retrieved. For example, once a user has logged into a computing device (e.g., 500, FIG. 5), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

As used herein, a "cloud" refers to servers that are accessed over the Internet (and the software and databases that executes on those servers). With the help of cloud (or "cloud computing"), users or organizations do not need to manage physical servers themselves or execute software applications on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

Cloud computing is possible because of a technology called "virtualization". Virtualization allows for the generation of a VM that behaves as if it was a physical computing device with its own hardware components. When properly implemented, VMs on the same host are sandboxed from one another so that they do not interact with each other, and the files and/or applications from one VM are not visible to another VM even though they are on the same physical computing device.

In one or more embodiments, cloud computing environments (which may or may not be public) may include storage environments that may provide data protection functionality for one or more users. Cloud computing environments may also perform computer-implemented services (e.g., data protection, data processing, etc.) on behalf of one or more users. Some example cloud computing environments that embodiments of the invention may be employed include (but not limited to): Microsoft® Azure, Amazon® AWS. Dell® Cloud Storage Services, Google® Cloud, etc.

In one or more embodiments, the data clusters (e.g., 120A, 120B, 120N) may be a part of a business operation region (BOR) (not shown) of an organization, in which the BOR corresponds to a geographic region (e.g., a city, a county, a state, a province, a country, a country grouping (e.g., the European Union), etc.). For example, data cluster A (120A) of Organization X may be located in the United States and another data cluster (e.g., 120B) of Organization X may be located in the Netherlands, in which Organization X has multiple geographically distributed data clusters around the world.

In one architecture (e.g., the "unidirectional" architecture), one of the data clusters (e.g., the parent data cluster) of an organization may be deployed to the United States, which serves (e.g., shares) data to/among the remaining data clusters (e.g., the child data clusters that are deployed to Argentina, India, and France) of the organization. In this architecture, the child data clusters may transmit their data to the parent data cluster so that the parent data cluster is always updated. Thereafter, the parent data cluster may distribute/forward received data to the child data clusters to keep the child data clusters equally updated.

In another architecture (e.g., the "bidirectional" architecture), one of the data clusters of an organization may be deployed to Greece and the other one may be deployed to Spain, in which both data clusters know each other and when a data change is occurred in one of them, the other data cluster may automatically obtain that data to stay updated. Further, in another architecture (e.g., the "multidirectional" architecture), an organization may have multiple data clusters deployed around the world and all of the data clusters know each other. When one of the data clusters is updated (e.g., when that data clusters receives a software package), the remaining data clusters are updated accordingly (e.g., by sending a data transfer request to each of the remaining data clusters).

In one or more embodiments, the data clusters (e.g., 120A, 120B, 120N) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device cause the computing device to perform the functionality of the data clusters (e.g., 120A, 120B, 120N) described throughout this application.

Alternatively, in one or more embodiments, the data clusters (e.g., 120A, 120B, 120N) may be implemented as a logical device. The logical device may utilize the computing resources of any number of computing devices to provide the functionality of the data cluster (120) described throughout this application.

In one or more embodiments, the network (105) may represent a computing network configured for computing resource and/or messages exchange among registered computing hosts (e.g., the data cluster (120), Client B (110B), etc.). As discussed above, components of the system (100) may operatively connect to one another through the network (105) (e.g., a LAN, a WAN, a mobile network, a wireless LAN (WLAN), etc.). In one or more embodiments, the network (105) may be implemented using any combination of wired and/or wireless network topologies, and the network (105) may be operatively connected to the Internet or other networks. Further, the network (105) may enable interactions between, for example, the data cluster (120) and Client A (110A) through any number and type of wired and/or wireless network protocols (e.g., TCP, UDP, Internet Protocol version 4 (IPv4), etc.). Further, the network (105) may be configured to perform all, or a portion, of the functionality described in FIGS. 3.1-3.4.

The network (105) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components (e.g., the network device (208)) in the network (105), and (iii) limiting communication(s) on a granular level (e.g., on a per-port level, on a per-sending device level, etc.).

In one or more embodiments, before communicating data over the network (105), the data may first be broken into smaller batches (e.g., data packets) so that larger size data can be communicated efficiently. For this reason, the network-enabled subcomponents may break data into data packets. The network-enabled subcomponents may then route each data packet in the network (105) to distribute network traffic uniformly.

In one or more embodiments, the network-enabled subcomponents may decide how real-time (e.g., on the order of milliseconds or less) network traffic and non-real-time network traffic should be managed in the network (105). In one or more embodiments, the real-time network traffic may be high priority (e.g., urgent, immediate, etc.) network traffic. For this reason, data packets of the real-time network traffic may need to be prioritized in the network (105). The real-time network traffic may include data packets related to, for example (but not limited to): videoconferencing, web browsing, voice over Internet Protocol (VOIP), etc.

In one or more embodiments, the non-real-time network traffic may be low priority (e.g., non-urgent) network traffic. For this reason, data packets of the non-real-time network traffic may not need to be prioritized in the network (105). The non-real-time network traffic may include data packets related to, for example (but not limited to): File Transfer Protocol (FTP) for web publishing, email applications, etc.

In one or more embodiments, the clients (e.g., 110A, 110B, etc.) may be physical or logical computing devices configured for hosting one or more workloads and/or for providing computing environments whereon workloads may be implemented. The clients (e.g., 110A, 110B, etc.) may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more SLAs configured by users of the clients (e.g., 110A, 110B, etc.)). In one or more embodiments, the clients (e.g., 110A, 110B, etc.) may correspond to computing devices (located on the other side of the network (105)) that one or more users (discussed below) use to interact with one or more components of the system (100).

In one or more embodiments, the clients (e.g., 110A, 110B, etc.) may include any number of applications (and/or content accessible through the applications) that provide computer-implemented application services to the users. Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide the aforementioned application services, each application may host similar or different components. The components may be, for example (but not limited to): instances of databases, instances of email servers, etc. Applications may be executed on the clients (e.g., 110A, 110B, etc.) as instances of an application.

Further, applications may vary in different embodiments, but in certain embodiments, applications may be custom developed or commercial (e.g., off-the-shelf) applications that a user desires to execute in a client (e.g., 110A, 110B, etc.). In one or more embodiments, applications (e.g., a word processor, a media player, a web browser, a file viewer, an image editor, etc.) may be (i) designed and configured to perform one or more functions instantiated by a user and (ii) logical entities executed using computing resources of a client (e.g., 110A, 110B, etc.). For example, applications may be implemented as computer instructions, e.g., computer code, stored on persistent storage of a client (e.g., 110A, 110B, etc.) that when executed by the processor(s) of the client (e.g., 110A, 110B, etc.) cause the client (e.g., 110A, 110B, etc.) to provide the functionality of the applications described throughout the application.

In one or more embodiments, while performing, for example, one or more operations requested by a user, applications installed on a client (e.g., 110A, 110B, etc.) may include functionality to request and use physical and/or logical components of the client (e.g., 110A, 110B, etc.). Applications may also include functionality to use data stored in storage/memory resources of the client (e.g., 110A, 110B, etc.). The applications may perform other types of functionalities not listed above without departing from the scope of the invention. In one or more embodiments, while providing application services to a user, applications may store data that may be relevant to the user in storage/memory resources of a client (e.g., 110A, 110B, etc.).

In one or more embodiments, the clients (e.g., 110A, 110B, etc.) may issue requests to the data cluster (120) to receive responses and interact with various components of the data cluster (120). The clients (e.g., 110A, 110B, etc.) may also request data from and/or send data to the data cluster (120). Further, the clients (e.g., 110A, 110B, etc.) may initiate an application to execute on the data cluster (120) such that the application may (itself) gather, transmit, and/or otherwise manipulate data located in the data cluster (120), remote to the clients (e.g., 110A, 110B, etc.). In one or more embodiments, the clients (e.g., 110A, 110B, etc.) may share access to more than one data cluster and may similarly share any data located in those data clusters.

In one or more embodiments, when a client (e.g., 110A, 110B, etc.) interacts with the data cluster (120), data that is relevant to the client (e.g., 110A, 110B, etc.) may be stored (temporarily or permanently) in that data cluster (120). For example, consider a scenario in which the SAN infrastructure (210) hosts a database utilized by the clients (e.g., 110A, 110B, etc.). In this scenario, the database may be a client database associated with users of the clients (e.g., 110A, 110B, etc.). When a new user is identified, the SAN infrastructure (210) may add information of the new user to the client database. By doing so, data that is relevant to the clients (e.g., 110A, 110B, etc.) may be stored in the SAN infrastructure (210). This may be done because an administrator of the SAN infrastructure (210) may desire access to the information of the new user at some point-in-time.

As yet another example, a client (e.g., 110A, 110B, etc.) may execute an application that interacts with an application database hosted by the data cluster (120). When an application upgrade is available to fix a critical software issue, the data cluster (120) may identify the client (e.g., 110A, 110B, etc.) that requires the application upgrade. The application database may then provide the application upgrade to the client (e.g., 110A, 110B, etc.). By doing so, the application executed by the client (e.g., 110A, 110B, etc.) may be kept up-to-date. As yet another example, a client (e.g., 110A, 110B, etc.) may send instructions to the data cluster (120) to configure one or more VMs hosted by the data cluster (120). In one or more embodiments, instructions may be, for example (but not limited to): instructions to configure a backup policy, instructions to take a snapshot of VM data, etc. The clients (e.g., 110A, 110B, etc.) may perform other types of functionalities not listed above without departing from the scope of the invention.

In one or more embodiments, the clients (e.g., 110A, 110B, etc.) may provide computer-implemented services to users (and/or other computing devices such as, other clients or other types of devices). The clients (e.g., 110A, 110B, etc.) may provide any number and any type of computer-implemented services (e.g., data storage services, electronic communication services, etc.). To provide computer-implemented services, each client (e.g., 110A, 110B, etc.) may include a collection of physical components (e.g., processing resources, storage/memory resources, networking resources, etc.) configured to perform operations of the client (e.g., 110A, 110B, etc.) and/or otherwise execute a collection of logical components (e.g., applications, virtualization resources, etc.) of the client (e.g., 110A, 110B, etc.).

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), a computation acceleration resource, application specific integrated circuits (ASICs), a digital signal processor for facilitating high speed communication, etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), an SSD, RAM, Flash memory, a tape drive, an FC-based storage device, a floppy disk, a diskette, a compact disc (CD), a digital versatile disc (DVD), a NVMe device, a NVMe over Fabrics (NVMe-oF) device, resistive RAM (ReRAM), persistent memory (PMEM), virtualized storage, virtualized memory, etc.

As used herein, "storage" refers to a hardware component that is used to store data in a client (e.g., 110A, 110B, etc.). Storage may be a physical computer-readable medium. In most cases, storage may be configured as a storage array (e.g., a network attached storage array), in which a storage array may refer to a collection of one or more physical storage devices. Each physical storage device may include non-transitory computer-readable storage media, in which the data may be stored in whole or in part, and temporarily or permanently.

As used herein, "memory" may be any hardware component that is used to store data in a client (e.g., 110A, 110B, etc.). The data stored may be accessed almost instantly (e.g., in milliseconds) regardless of where the data is stored in memory. The memory may provide the above-mentioned instant data access because the memory may be directly connected to a CPU on a wide and fast bus (e.g., a high-speed internal connection that transfers data among hardware components of a client (e.g., 110A, 110B, etc.)).

In one or more embodiments, a client (e.g., 110A, 110B, etc.) may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while applications provide computer-implemented services to the clients (e.g., 110A, 110B, etc.), the applications may store data that may be relevant to the clients (e.g., 110A, 110B, etc.) to the storage/memory resources. When the client-relevant data is stored, the client-relevant data may be subjected to loss, inaccessibility, or other undesirable characteristics based on the operation of the storage/memory resources.

To mitigate, limit, and/or prevent such undesirable characteristics, users of the clients (e.g., 110A, 110B, etc.) may enter into agreements (e.g., SLAs) with providers (e.g., vendors) of the storage/memory resources. These agreements may limit the potential exposure of client-relevant data to undesirable characteristics. These agreements may, for example, require duplication of client-relevant data to other locations so that if the storage/memory resources fail, another copy (or other data structure usable to recover the data on the storage/memory resources) of the client-relevant data may be obtained. These agreements may specify other types of activities to be performed with respect to the storage/memory resources without departing from the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface a client (e.g., 110A, 110B, etc.) with external entities (e.g., other clients, the data cluster (120) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., TCP, UDP, RDMA, IEEE 801.11, etc.) for the transmission and receipt of data.

In one or more embodiments, a networking resource may implement and/or support the above-mentioned protocols to enable the communication between the client (e.g., 110A, 110B, etc.) and external entities. For example, a networking resource may enable the client (e.g., 110A, 110B, etc.) to be operatively connected, via Ethernet, using a TCP protocol to form a "network fabric", and may enable the communication of data between the client (e.g., 110A, 110B, etc.) and the external entities. In one or more embodiments, each client (e.g., 110A, 110B, etc.) may be given a unique identifier (e.g., an IP address) to be used when utilizing the above-mentioned protocols.

Further, a networking resource, when using a certain protocol or a variant thereof, may support streamlined access to storage/memory media of other clients. For example, when utilizing RDMA to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of a client (e.g., 110A, 110B, etc.). The VM (and applications hosted by the VM) may generate data (e.g., VM data) that is stored in the storage/memory resources of the client (e.g., 110A, 110B, etc.), in which the VM data may reflect a state of the VM. In one or more embodiments, the VM may provide services to users, and may host instances of databases, email servers, or other applications that are accessible to the users.

In one or more embodiments, a virtualization resource may include a hypervisor, in which the hypervisor may be configured to orchestrate an operation of a VM by allocating computing resources of a client (e.g., 110A, 110B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on storage/memory resources of the client (e.g., 110A, 110B, etc.) that when executed by processing resources of the client cause the client to provide the functionality of the hypervisor.

In one or more embodiments, a client (e.g., 110A, 110B, etc.) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client (e.g., 110A, 110B, etc.) described throughout this application.

Alternatively, in one or more embodiments, similar to the data cluster (120), the client (e.g., 110A, 110B, etc.) may also be implemented as a logical device.

In one or more embodiments, users may interact with (or operate) the clients (e.g., 110A, 110B, etc.) in order to perform work-related tasks (e.g., production workloads). In one or more embodiments, the accessibility of users to the clients (e.g., 110A, 110B, etc.) may depend on a regulation set by an administrator of the clients (e.g., 110A, 110B, etc.). To this end, each user may have a personalized user account that may, for example, grant access to certain data, applications, and computing resources of the clients (e.g., 110A, 110B, etc.). This may be realized by implementing the "virtualization" technology (discussed above).

In one or more embodiments, for example, a user may be automatically directed to a login screen of a client (e.g., 110A, 110B, etc.) when the user connected to that client (e.g., 110A, 110B, etc.). Once the login screen of the client (e.g., 110A, 110B, etc.) is displayed, the user may enter credentials (e.g., username, password, etc.) of the user on the login screen. The login screen may be a graphical user interface (GUI) generated by a visualization module (not shown) of the client (e.g., 110A, 110B, etc.). In one or more embodiments, the visualization module may be implemented in hardware (e.g., circuitry), software, or any combination thereof.

In one or more embodiments, the GUI may be displayed on a display of a computing device (e.g., 500, FIG. 5) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

Figure 2:
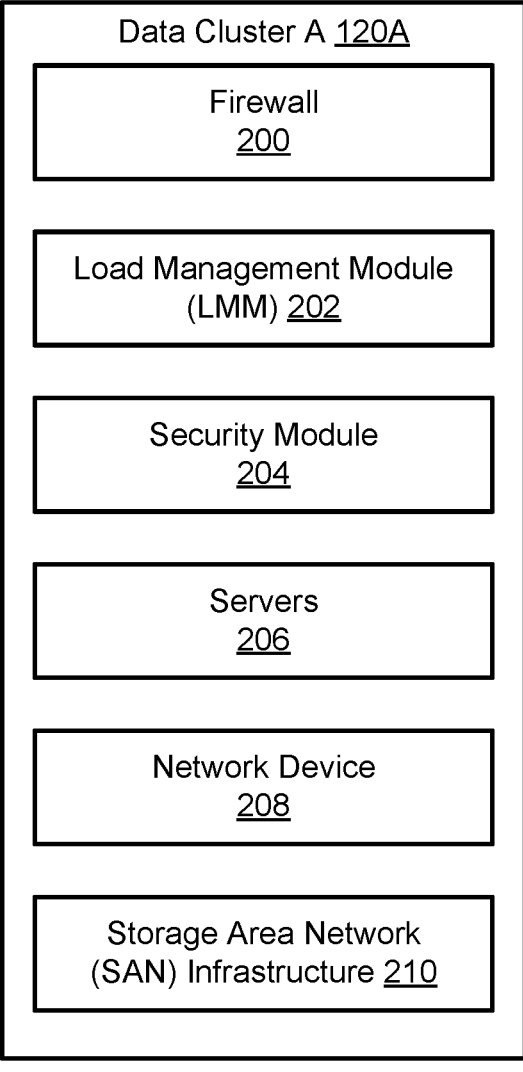
FIG. 2 shows a diagram of a data cluster in accordance with one or more embodiments of the invention.

FIG. 2 shows a diagram of a data cluster in accordance with one or more embodiments disclosed herein. Data cluster A (120A) may be an embodiment of the data clusters discussed above in FIG. 1. In one or more embodiments, data cluster A (120A) may include the firewall (200), a load management module (202), one or more security modules (e.g., 204), the servers (206), the network device (208), and storage (e.g., 210).

In one or more embodiments, the firewall (200) is a network monitoring/security component that monitors all incoming and outgoing network traffic (e.g., requests, responses, calls, etc.), in which it decides whether to allow or block specific network traffic based on a defined set of security rules. The firewall (200) may be, for example (but not limited to): a hardware component, a software component, a software as-a-service (SaaS), a private cloud, etc. The aforementioned example is not intended to limit the scope of the invention.

The firewall (200) may include functionality to monitor (e.g., track) network traffic in the network (105) to obtain a dataset. In one or more embodiments, the dataset may include, for example (but not limited to): a request (e.g., an application programming interface (API) call), a type of a request (e.g., a "get" request, a "delete" request, an "update" request, a "post" request, etc.), a response to a request (e.g., a response to an API call), corresponding response time for a request, a list of application data that is being used (e.g., obtained, updated, etc.) by an API (e.g., application data 1 and 2 are being used by API X to change locations of both data in the file system), a list of operations that is being done on application data (e.g., while renaming application data 2, API X encrypted application data 2; after encrypting, API X duplicated and modified application data 2), a usage level (e.g., 50 times in 1 hour, 10 times in 1 minute, etc.) of an application data by an API, a period of time within which application data is being used by an API, etc.

As used herein, an "API call" may refer to a process of an application or a computing device submitting a request to an API (e.g., a component that acts as the "front door" for applications to access data and/or functionality from back-end services) to retrieve the requested data from an external application or an external computing device.

In one or more embodiments, a request and a response to that request may be communicated over the network (105). In one or more embodiments, corresponding response time for a request may be a period of time, with a definite start and end, within which a response process is set to be completed.

In one or more embodiments, the firewall (200) may periodically obtain the dataset from the network traffic. The firewall (200) may also obtain the dataset from the network traffic in real-time. The firewall (200) may then store (temporarily or permanently) the dataset in a storage/memory resource (e.g., the SAN infrastructure (210)) of data cluster A (120A).

In one or more embodiments, the firewall (200) may also monitor the network traffic to determine, for example (but not limited to): availability of the network (105), unusual activities (e.g., exploitation events) on the network (105), etc. In most cases, an unusual activity on the network (105) may be a sign of a security issue (e.g., a malicious attack, distributed denial of service (DDOS) attack, malware attack, etc.). Because of the determined unusual activity, the firewall (200) may notify an administrator (e.g., a network service provider (NSP)) of the network (105). Based on receiving the notification from the firewall (200), the NSP of the network (105) may reconfigure the network (105) to fix the security issue.

In one or more embodiments, because of increased network traffic, the firewall (200) may detect latency (e.g., delay) in the network (105). Because of the latency (e.g., 35 ms latency Quality of Service (QOS) network connection), the firewall (200) may also notify the NSP. Based on receiving the notification from the firewall (200), the NSP may also reconfigure the network (105) to minimize the latency (e.g., the time it takes for data packets to be transmitted, stored, or retrieved).

In one or more embodiments, the firewall (200) may detect latency in the network traffic because of, for example (but not limited to): an increased amount of requests, an increased amount of responses, an increase in a size of a request, an increase in a size of a response, etc. One of ordinary skill will appreciate that the firewall (200) may perform other functionalities without departing from the scope of the invention.

In one or more embodiments, the firewall (200) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the firewall (200) described throughout this application.

Alternatively, in one or more embodiments, similar to the data cluster (120), the firewall (200) may also be implemented as a logical device.

In one or more embodiments, the network device (208) may be any type of network device (e.g., a switch, a router, etc.) that enables computing devices to communicate with other computing devices in a network environment. The network device (208) may include functionality to, e.g.: (i) use information (e.g., network use information, network configuration information that specify any number of configurations for a network device to provide its functionalities with a high configurability, etc.) included in a provided services repository (not shown) to determine how to provide/configure its respective services (for example, (a) the repository may specify identifiers of services and corresponding ports for the network device (208) and (b) the repository may specify how to configure the network device (208) at any level of granularity), (ii) based on a request received from the security module (204), generating a secure data retrieval path (e.g., a secure tunnel) across the network (105), (iii) perform any number and type of communications schemes (e.g., Internet protocol (IP) communications, Ethernet communications, etc.), (iv) being configured by other computing devices, and (v) limiting communications on a granular level (e.g., on a per port level, on a per sending device level, etc.) via filtering or other methodology.

In one or more embodiments, the provided services repository may be maintained by, for example, the SAN infrastructure (210). The SAN infrastructure (210) may add, remove, and/or modify information included in the provided services repository. The SAN infrastructure (210) may do so based on information or a request/call obtained from administrators, other data structures, and/or from other sources (e.g., the security module (204)). The data structures of the provided services repository may be implemented using, for example, lists, tables, unstructured data, databases, etc. While described as being stored locally, the provided services repository may be stored remotely and may be distributed across any number of devices without departing from the invention.

In one or more embodiments, the network device (208) may provide compression of network traffic at any level of a network stack or at any protocol (or network layer). The network device (208) may also provide transport layer protocol optimizations (e.g., transport control protocol (TCP) optimizations), flow control, performance, modifications and/or management to accelerate delivery of applications and data, for example, (i) over a wide area network (WAN) connection, (ii) for any session, or (iii) for any application layer.

In one or more embodiments, the network device (208) may act as any type and form of transport control protocol or transport layer terminating device, such as a gateway or a firewall. For example, the network device (208) may terminate a transport control protocol by establishing a transport control protocol connection with a second network device (for example, included in Client A (110A)). As yet another example, the network device (208) may terminate a transport control protocol by managing the behavior of the transport control protocol connection between the network device (208) and a second network device (for example, included in Client B (110B)), in which the network device (208) may change, queue, or transmit network packets to effectively terminate the transport control protocol connection.

In one or more embodiments, network devices (e.g., the network device (208) and a second network device) may, at least, (i) provide a secure (e.g., an encrypted) tunnel by employing a tunneling protocol (e.g., the generic routing encapsulation (GRE) tunneling protocol, the IP-in-IP tunneling protocol, the secure shell (SSH) tunneling protocol, the point-to-point tunneling protocol, the virtual extensible local area network (VXLAN) protocol, etc.), (ii) set up efficient and secure connections (e.g., a virtual private network (VPN) connection (or a trust relationship), a secure socket layer VPN (SSL VPN) connection, an IP security (IPSec) based VPN connection, a transport layer security VPN (TLS VPN) connection, etc.) between networks, (iii) enable the usage of unsupported network protocols, (iv) manage access to resources between different networks (with more granular control) and track all the operations and network traffic logins, and (v) in some cases, enable users to bypass firewalls (e.g., provide endpoint-to-endpoint connections across a hybrid network without opening firewall rules in an enterprise network). To this end, the network device (208) may include any logic, functions, rules, or operations to perform services or functionalities (for communications between, for example, the data cluster (120) and Client A (110A)) such as, for example, SSL VPN connectivity, SSL offloading, switching/load balancing, hypertext transfer protocol secure (HTTPS)—encrypted connections, domain name service (DNS) resolution, and acceleration techniques (e.g., compression (e.g., a context-insensitive compression or context-sensitive compression by employing a delta-type compression model, a lossless compression model, or a lossy compression model), decompression, TCP pooling, TCP multiplexing. TCP buffering, caching, etc.).

As used herein, in networking, "tunneling" is a way for transporting data across a network (e.g., 105) using protocols (standardized set of rules for (i) formatting and processing data, and (ii) enabling computing devices to communicate with one another) that are not supported by that network. In general, a "secure tunnel" refers to a group of microservices that includes, for example (but not limited to): a user interface (UI) server service, an API server service, a controller service, a tunnel connection service, an application mapping service, etc.

Tunneling works by encapsulating packets (packets are small pieces of data that may be re-assembled at their destination into a larger file), in which an "encapsulated packet" is essentially a packet inside another packet. In an encapsulated packet, the header and payload of the first packet goes inside the payload section of the surrounding packet where the original packet itself becomes the payload.

In one or more embodiments, encapsulation may be useful for encrypted network connections ("encryption" refers to the process of scrambling data in such a way that the data may only be unscrambled using a secret encryption key, in which the process of undoing the encryption is called "decryption"). If a packet is completely encrypted (including the header), then network routers will not be able to transport the packet to its destination because they do not have the key and cannot see its header. By wrapping the encrypted packet inside another unencrypted packet, the packet may travel across networks like normal.

In one or more embodiments, network devices (the network device (208) and a second network device) may provide, for example, a TLS VPN connection between the data cluster (120) and Client B (110B). For example, the security module (204) may request (e.g., initiate) generation (e.g., establishment) of an end-to-end secure tunnel (e.g., a TLS VPN connection) from data cluster A (120A) to Client B (110B) over the network (105). Once the secure tunnel is generated: (i) a network device deployed to Client B (110B) may receive one or more data packets from the storage of Client B, (ii) the network device deployed to Client B (110B) may encrypt the data packets and transmit them to the network device (208) via the secure tunnel, (iii) after receiving the data packets, the network device (208) may decrypt the data packets and transmit them to the LMM (202) and/or the security module (204), (iv) if the data packets satisfy one or more attribution rules specified in configuration parameters (described below in reference to FIG. 4), the security module (204) sends them to the SAN Infrastructure (210), and (v) the network device (208) and network device deployed to Client B (110B) may then effectively terminates the secure tunnel by managing the behavior of the secure tunnel (e.g., the TCP connection) between data cluster A (120A) and Client B (110B).

In one or more embodiments, the network device (208) may include an encryption/decryption engine (not shown) providing logic, business rules, functions, or operations for handling the processing of any security related protocol (e.g., the SSL protocol, the TLS protocol, etc.) or any function related thereto. For example, the encryption/decryption engine may encrypt and/or decrypt data packets (based on executable instructions running on an encryption/decryption processor), or any portion thereof, communicated via the network device (208). The encryption/decryption engine may also establish secure tunnel connections on behalf of the network device (208). In one or more embodiments, the network device (208) may also include a network optimization engine (not shown) for optimizing, accelerating, or otherwise improving the performance, operation, or quality of any network traffic (or communications) traversing the network device (208).

In one or more embodiments, the network device (208) has one or more ports (e.g., port 443, port 1521, port 8881, etc.) for transmitting and receiving data packets over a secure tunnel (or over the network (105)). The ports may provide a physical and/or logical interface between network devices (for example, the network device (208) and a second network device) and the network (105) (or another computing device for transmitting and receiving network communications). In one or more embodiments, the type and form of a port may depend on (i) the type and form of the network (105) and (ii) the type of medium for connecting to the network (105).

As used herein, a "port" is a number representing communication endpoints in computer networking. A port is an unsigned 16-bit integer (0-65535) that identifies a specific process or a network service. In most cases, a port may employ a TCP or a user datagram protocol (UDP). The TCP enables two hosts to establish a connection and to exchange streams of data packets. The TCP also guarantees a delivery of data packets, in which the data packets will be delivered in the same order they were sent. Like the TCP, the UDP may be used in combination with IP and it facilitates a transmission of datagrams from one application to another application. However, unlike the TCP, the UDP does not guarantee a reliable communication. This means that it is up to the application (that received the message) to process any errors and verify the delivery.

In one or more embodiments, the network device (208) may be deployed based on (i) an "in-line of traffic" configuration or (ii) a "virtual in-line mode" configuration. In one or more embodiments, the network device (208) may be deployed in-line (or in parallel) to one or more of the following: a router, a security module, a server, or another network device. Further, the network device (208) may be deployed based on the virtual in-line mode configuration. In this configuration, a router (or a network device with routing or switching functionality) is configured to forward, re-route, or otherwise provide data packets (e.g., network packets) destined to the network device (208).

The network device (208) may then perform any desired processing on the data packets, such as any of WAN optimization techniques. Upon completion of processing, the network device (208) may forward the processed data packets to the router to transmit to the destination over the network (105). By this way, the network device (208) may be coupled to the router in parallel but still operate as it if the network device (208) were in-line. This deployment configuration may also provide transparency in the source and destination addresses, and port information are preserved as the data packets are processed and transmitted via the network device (208) through the network (105).

In one or more embodiments, the network device (208) may be implemented using any combination of wired and/or wireless network topologies. The network device (208) may employ any number and type of communications to enable, for example, the data cluster (120) and Client B (110B) to communicate with each other. Further, the network device (208) may be configured to perform all, or a portion, of the functionality described in FIGS. 3.1-3.4.

In one or more embodiments, the network device (208) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the network device (208) described throughout this application.

Alternatively, in one or more embodiments, similar to data cluster A (120A), the network device (208) may also be implemented as a logical device.

In one or more embodiments, because the components (described above and below) of data cluster A (120A) store and manage business-critical data and applications (e.g., services), data cluster security is one of the key aspects while designing a data cluster. To achieve this, as an additional, active, standby, and reliable security layer, the security module (204) may be deployed between (or disposed between) the firewall (200) and other components of data cluster A (120A) so that, for example, (i) each component behind the security module (204) may remain intact, and (ii) business-critical data and services and their disaster recovery mechanisms may not directly exposed to the network (105) (because, in general, most of database applications and/or web services provided by a data cluster are directly exposed to a network with the protection of a single firewall layer, and in case of any attack or disaster, the data cluster may be vulnerable to direct attacks or impacts).

In one or more embodiments, the data cluster A (120A) may include one or more security modules (e.g., 204) that execute independently from the firewall (200) of data cluster A (120A). In one or more embodiments, one instance of a security module (e.g., 204) may be deployed to each data cluster, for example, of an organization.

In one or more embodiments, as being a lightweight multi-site application executing in each site of an organization, the organization may easily configure, deliver, and manage each security module (e.g., 204) across, for example, multiple cloud environments for high availability and reliability. Further, each security module (e.g., 204) may provide, for example (but not limited to): global load balancing, site failover, network traffic management across an organization's multiple data clusters and public cloud provider networks, etc. In order to provide the aforementioned functionalities, each security module (e.g., 204) may (i) monitor the health, availability, and latency for each site, and (ii) perform one or more policies that have been configured around regulatory requirements.

In one or more embodiments, each security module (e.g., 204) may also, for example (but not limited to): ensure multi-site resiliency and disaster recovery (e.g., a security module (e.g., 204) may redirect network traffic to the closest or best performing data cluster, or to healthy data clusters if there is an outage), improve data cluster performance and availability (for example, if network traffic is not distributed appropriately across data clusters, one site might become oversubscribed while another is underutilized, and with its network traffic management functionality, a security module may ensure that the load is balanced more evenly across sites for an optimal user experience), improve scalability and agility of data clusters, implement load balancing and reduce latency in data clusters (by ensuring that no single data cluster is overloaded with too many valid requests), satisfy regulatory and security requirements (e.g., configuration parameters), etc.

One of ordinary skill will appreciate that the security module (204) may perform other functionalities without departing from the scope of the invention. In one or more embodiments, the security module (204) may be configured to perform all, or a portion, of the functionalities described in FIGS. 6.1-6.2. Additional details of the security module are described below in reference to FIG. 4.

In one or more embodiments, the security module (204) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the security module (204) described throughout this application.

Alternatively, in one or more embodiments, similar to data cluster A (120A), the security module (204) may also be implemented as a logical device.

In one or more embodiments, the SAN infrastructure (210) is a specialized, high-speed network that provides high-performance and low-latency network access to storage devices (e.g., a networked storage solution). In one or more embodiments, the SAN infrastructure (210) may include, for example, one or more hosts (e.g., a SAN metadata server, a SAN data replication server, a SAN management server, etc.), one or more switches (e.g., a Fibre Channel (FC) switch, an Ethernet switch, an InfiniBand switch, etc.), one or more gateways (to move data between different SAN infrastructures), and one or more storage devices (e.g., redundant array of independent disks (RAID), a storage pool, a virtual storage resource for access by a remotely located computing device, etc.) that are interconnected using a variety of technologies, interfaces, topologies, and protocols (e.g., FC. Internet small computer systems interface (iSCSI), SCSI, nonvolatile memory express (NVMe), Fibre Connection (FICON), Fibre Channel over Ethernet (FCoE), remote direct memory access (RDMA), secure remote password (SRP), etc.).

In one or more embodiments, through different types of virtualization, the SAN infrastructure (210) may present storage devices to a host such that the storage devices appear to be locally attached. More specifically, storage traffic over, for example, FC avoids TCP/IP packetization and latency issues, as well as any LAN congestion, ensuring the highest simultaneous access speed available for media and mission critical stored data. Further, the SAN infrastructure (210) may be used to, for example (but not limited to): improve application (and/or data) availability (e.g., via multiple data paths, internal fallback (e.g., hardware redundancy) mechanisms, etc.), enhance application performance (e.g., via off-load storage functions, segregate networks, etc.), increase storage utilization and effectiveness (e.g., by consolidating storage resources, providing tiered storage, etc.), etc.

In one or more embodiments, a storage device (e.g., a device to store data and provide access to stored data) of the SAN infrastructure (210) may store unstructured and/or structured data that may include, for example (but not limited to): an identifier, an alias, a serial number, a vendor name or identifier, a model identifier, an identification of at least one capability, an identification of an available functionality, an identification of a resource provided by a storage device, a data cluster identifier, a storage device identifier, an access control list (ACL), a type of a data cluster, a size of a data cluster, an amount of space used in a data cluster, an amount of space available in a data cluster, information associated with redundancy features, a storage pool identifier, a parent storage pool identifier, a size of a storage pool, an amount of space used in a storage pool, an amount of space available in a storage pool, information associated with the types of provisioning functionality availability, default configuration data of a storage device, status data of a storage device, a unique data chunk (referring to a fragment or a partition of undeduplicated data capturing a unique byte pattern that may occur or recur throughout the undeduplicated data), etc.

As used herein, a "switch fabric" is an interconnected network of switching devices that may include one or more input and output ports for communicating with a switch in a network of switching devices. As an interconnect architecture (e.g., a combination of hardware and software components), a switch fabric may (i) redirect data within a system (e.g., the SAN infrastructure (210)) from one of the ports in a line card to another port in a different line card and (ii) dynamically modify ACLs to include identifications of VMs, host computing devices, and/or network ports authorized to access a storage device. Further, a switch fabric may be a heterogeneous device, including switches that communicate based on the aforementioned protocols.

In one or more embodiments, the SAN infrastructure (210) may provide data protection (e.g., data backup, data replication, data management, data restore, etc.) services to the clients (e.g., 110A, 110B, etc.) (or any other component of the system (100)). The data protection services may initiate generation and storage of backups (e.g., block-based backups, file-based backups, etc.) in the SAN infrastructure (210). The data protection services may also include restoration of the clients (e.g., 110A, 110B, etc.) (or any other component of the system (100)) to a restoration host (not shown) using the backups stored (temporarily or permanently) in the SAN infrastructure (210).

More specifically, the SAN infrastructure (210) may provide data protection services to the clients (e.g., 110A, 110B, etc.) (or any other component of the system (100)) by orchestrating (or scheduling): (i) generation of backups of the clients (e.g., 110A, 110B, etc.), (ii) storage of the generated backups of the clients (e.g., 110A, 110B, etc.), (iii) consolidation of one or more backup requests to reduce (or to prevent) generation of backups that are not useful for restoration purposes, and (iv) restoration of the clients (e.g., 110A, 110B, etc.) to previous states using backups stored in the SAN infrastructure (210). Further, to provide the aforementioned services, the SAN infrastructure (210) may include functionality to generate and issue instructions to any other component of the system (100). The SAN infrastructure (210) may also generate instructions in response to data protection requests from other entities.

In one or more embodiments, the SAN infrastructure (210) may generate such instructions in accordance with data protection schedules that specify when a protection needs to be performed. In one or more embodiments, a data protection schedule may lay out specific points in time for a protection to be performed. A data protection schedule may be configured based on a user's RPO.

As used herein, a "user's RPO" is the time between a data loss event and a most recent backup. For example, if a user has a 4-hour RPO for an application, then the maximum gap between a data loss event and the most recent backup will be 4-hours. In most cases, having a 4-hour RPO may not necessarily mean that a corresponding user will lose 4 hours' worth of data. For example, consider a scenario in which a word processing application goes down at 12:35 a.m. and restored by 1:10 a.m. In this scenario, the user may not have much data to lose.

As yet another example, consider a scenario in which a security application goes down at 10:05 a.m. and could not be restored until 1:25 p.m. In this scenario, the user may lose data that is highly valuable to the user. For this reason, the user may set an RPO based on the application priority and may configure the backup schedules accordingly.

In one or more embodiments, while performing one or more operations requested by a user (or an administrator) of data cluster A (120A), the SAN infrastructure (210) may include functionality to request and use resources (e.g., data, computing resources, etc.) available in data cluster A (120A). Additional details of the resources (e.g., processing resources, networking resources, etc.) are described below. In one or more embodiments, the administrator may be a user with permission (e.g., a user that has root-level access) to make changes on data cluster A (120A) that will affect other users of data cluster A (120A).

In one or more embodiments, in order to provide the above-mentioned functionalities, the SAN infrastructure (210) may need to communicate with other components of data cluster A (120A) with minimum amount of latency (e.g., with high-throughput (e.g., a high data transfer rate) and sub-millisecond latency). For this reason, REST APIs may be used to enable communication(s) between the SAN infrastructure (210) and the other components.

As used herein, a "REST API" is an interface that two computing devices use to exchange data securely over the Internet (or to exchange data internally). More specifically, the term "REST" defines a set of rules and constraints (not a protocol or a standard) that need to be followed when building a communication path(s). Any computing device that adheres to those rules and constraints will be able to communicate via a set of uniform, shared, and stateless (or stateful) operators and requests. APIs denote the underlying code that, if it conforms to the set of rules and constraints, allows computing devices to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate a computing device's connection (e.g., access) to one another. In general, the computing device performing the accessing is called "the client", and the computing device containing a resource is called "the server".

In operation, REST APIs use HTTP to communicate. More specifically, REST APIs communicate via HTTP to perform standard database functions such as, for example, creating, reading, updating, and deleting records within a resource. For example, a well-designed REST API is similar to a webpage executing on a web browser with built-in HTTP functionality. As used herein, "HTTP" is a request/response protocol that is used in cases in which a synchronous request/response is required. This means that computing devices making requests via REST APIs must be designed to expect an immediate response. If the client receiving the response is down, the sending service may be blocked while it awaits for the response. To prevent this, failover and error handling logic may be applied to (or built into) both applications.

In one or more embodiments, the SAN infrastructure (210) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the SAN infrastructure (210) described throughout this application.

Alternatively, in one or more embodiments, similar to the data cluster A (120A), the SAN infrastructure (210) may also be implemented as a logical device.

While the SAN infrastructure (210) has been illustrated and described as including a limited quantity and type of data, the SAN infrastructure (210) in accordance with embodiments of the invention may store additional, less, and/or different data without departing from the scope of the invention.

In one or more embodiments, as being a physical computing device or a logical computing device (e.g., a VM), a server of the servers (206) may be configured for, e.g.: (i) hosting and maintaining various workloads, (ii) providing a computing environment (e.g., computing power and storage) whereon workloads may be implemented, (iii) providing computer-implemented services (e.g., receiving a request, sending a response to the request, etc.) to one or more entities (e.g., users, components of the system (100), etc.), and (iv) exchanging data with other components registered in/to the network (105) in order to, for example, participate in a collaborative workload placement. In one or more embodiments, in order to read, write, or store data, a server may communicate with the SAN infrastructure (210) via an FC switch (described above), which is deployed between (or disposed between) the server and the SAN infrastructure (210).

For example, a server may split up a request with another component of the system (e.g., 100, FIG. 1), coordinating its efforts to complete the request (e.g., to generate a response) more efficiently than if the server had been responsible for completing the request. In one or more embodiments, a request may be, for example (but not limited to): a web browser search request, a representational state transfer (REST) request, a computing request, a database management request, a registration request, a file upload/download request, etc. To provide the computer-implemented services to the entities, the server (e.g., an enterprise server, a modular server, a blade server, a mainframe, a workstation computer, etc.) may perform computations locally and/or remotely. By doing so, the server may utilize different computing devices (e.g., 500, FIG. 5) that have different quantities of computing resources (e.g., processing cycles, memory, storage, etc.) to provide a consistent experience to the entities. In one or more embodiments, the server may be a heterogeneous set, including different types of hardware components and/or different types of OSs.

Figure 3:
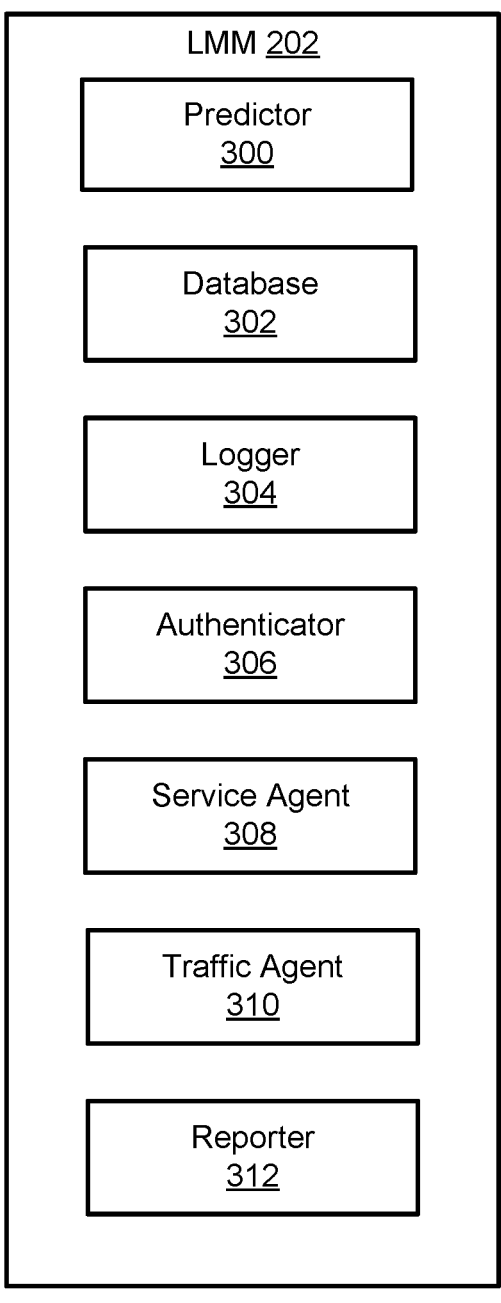
FIG. 3 shows a diagram of a load management module in accordance with one or more embodiments of the invention.

Turning now to FIG. 3, FIG. 3 shows a diagram of a load management module (LMM) in accordance with one or more embodiments of the invention. The LMM (202) may be an example of the LMM (202) discussed above in reference to FIGS. 1-2. The LMM (202) may include a predictor (300), a database (302), a logger (304), an authenticator (306), a service agent (308), a traffic agent (310) and a reporter (312). The LMM (202) may include additional, fewer, and/or different components without departing from the scope of the invention. Each component may be operatively connected to any of the other component via any combination of wired and/or wireless connections. Each component illustrated in FIG. 3 is discussed below.

In one or more embodiments, the LMM (202) may operate in a manner transparent (e.g., a transparent reverse proxy) to any component (e.g., a firewall (e.g., 200, FIG. 2), a SAN infrastructure (e.g., 210, FIG. 2), etc.) of a data cluster (e.g., 120A, FIG. 1) and any client (e.g., 110A, 110B, etc., FIG. 1) (or any user of that client) of that data cluster. In one or more embodiments, when any of the components of the LMM (202) are down or unavailable to perform their functionalities, a second LMM (not shown) (deployed to the same data cluster) may continue to provide functionalities of the unavailable component.

In one or more embodiments disclosed herein, the predictor (300) may include the functionality to: (i) identify load performance decline events for a data cluster and (ii) to determine whether the load performance of a data cluster has been restored. The predictor (300) may include one or more prediction models that generate predictions specifying future points in time in which a performance baseline data violation will occur. Additionally, the predictor (300) may also include the functionality to update the baseline performance data based on new performance baseline data obtained from users and/or using performance metrics associated with loads that do not require additional help from other LMMs and data clusters. One of ordinary skill will appreciate that the predictor (300) may perform other functionalities without departing from the scope of the invention. When providing its functionalities, the predictor (300) may perform all, or a portion, of the methods illustrated in FIGS. 5.1-5.2. The predictor (300) may be implemented using hardware, software, or any combination thereof.

In one or more embodiments disclosed herein, the database (302) may be a fully managed, local, and lightweight database (or any logical container such as SQLite database) that acts as a shared storage or memory resource (discussed above) that is functional to store unstructured and/or structured data. Further, the database (302) may also occupy a portion of a physical storage/memory device or, alternatively, may span across multiple physical storage/memory devices.

In one or more embodiments, the database (302) may be implemented using physical devices that provide data storage services (e.g., storing data and providing copies of previously stored data). The devices that provide data storage services may include hardware devices and/or logical devices. For example, the database (302) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (302) may include a memory device (e.g., a dual in-line memory device), in which data is stored and from which copies of previously stored data are provided. As yet another example, the database (302) may include a persistent storage device (e.g., an SSD), in which data is stored and from which copies of previously stored data is provided. As yet another example, the database (302) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (302) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (302) may store (temporarily or permanently) unstructured and/or structured data that may include (or specify), for example (but not limited to): one or more configuration parameters (described below) provided/configured by an administrator of a data cluster, one or more lists that specify which computer-implemented services should be provided to which user (depending on a user access level of a user), one or more policies/rules for the operation (or configuration) of any portion of the traffic agent (310) (to manage security, network traffic, network access, or any other function/operation performed by the traffic agent (310)), details of each data cluster and corresponding LMM of an organization (also referred to as LMM information) (e.g., how many storage boxes deployed to each SAN infrastructure, information regarding the criticality of data stored in a storage box, an IP address of each component deployed to a data cluster, active/passive port numbers of each component deployed to a data cluster, a product identifier of each component deployed to a data cluster, etc.) to provide a complete data integrity and availability across those data clusters, etc.

In one or more embodiments, the configuration parameters may specify (or include), for example (but not limited to): a request ruleset; a response ruleset; one or more rules/policies for (a) what data to cache, (b) when to cache the data, (c) for whom to cache the data, and (d) when to expire an object in cache or refresh the cache; one or more rules/policies that are provided based on (i) a profile of a user, (ii) an identification of a client, (iii) a type of a network connection, (iv) a type of a SAN infrastructure, (v) contents/payloads of network traffic, etc.

In one or more embodiments, during the deployment of the LMM (202), an administrator of the data cluster (e.g., 120, FIG. 1) may directly provide the configuration parameters (which may be configured directly), or the configuration parameters may be imported by the administrator in the form of, for example, an extensible markup language (XML) file or JavaScript object notation (JSON) file.

In one or more embodiments, a request ruleset (e.g., one or more rules/configurations that allows the traffic agent (310) to act as an inbound/incoming network traffic filter, one or more proxy parameters, etc.) may specify (or include), for example (but not limited to): a request decryption rule, a request authentication rule (which may be utilized by the authenticator (306) to validate a request), a rule regarding how the traffic agent (310) should operate, a type of an allowable network communication/protocol between an entity and the components of a data cluster, a particular header that needs to be included in an intercepted request, a smart contract that defines under what conditions a request should be accepted (e.g., granted), a smart contract that defines under what conditions a data packet should be transferred to a SAN infrastructure, one or more rules/policies to protect components of a data cluster against various classes and types of Internet-based vulnerabilities (e.g., buffer overflow, common gateway interface (CGI)—Bin parameter manipulation, form/hidden filed manipulation, forceful browsing, cross-site scripting (XSS), command injection, error triggering sensitive information leak, back doors and debug options, platform or OS vulnerabilities, etc.), etc.

In one or more embodiments, the authentication related rules (e.g., a request decryption rule) included in the request ruleset may be the same across all data clusters of an organization to perform a uniform and successful authentication process.

In one or more embodiments, a response ruleset (e.g., one or more rules/configurations that allow the traffic agent (310) to act as an inbound and outbound network traffic filter) may include (or specify), for example (but not limited to): an attribution rule (e.g., a type/format of an asset (e.g., a ".pdf" file, a ".doc" file, a "jpeg" file, etc.), a size of an asset, a content of an asset (e.g., a legal document, an engineering design document, etc.), an identifier of an asset, etc.), an asset sensitivity/criticality threshold that needs to be applied for all outgoing network traffic, etc.

In one or more embodiments, the authentication related rules included in the response ruleset may be the same across all data clusters of an organization to perform a uniform and successful authentication process.

In one or more embodiments, the database (302) may provide an indexing service. Further, in one or more embodiments, an index may include, for example (but not limited to) information about a valid user associated with requests, information associated with authenticated connections, information associated with LMMs in other data clusters, data cluster information, etc.

In one or more embodiments, the unstructured and/or structured data may be updated (automatically) by third party systems (e.g., platforms, marketplaces, etc.) (provided by vendors) or by administrators based on, for example, newer (e.g., updated) versions of configuration parameters being available.

In one or more embodiments, the unstructured and/or structured data may be maintained by, for example, the predictor (300), the logger (304), the authenticator (306), and/or the traffic agent (310). The aforementioned components may add, remove, and/or modify the data in the database (302) to cause the information included in the database (302) to reflect the latest version of, for example, configuration parameters. The unstructured and/or structured data available in the database (302) may be implemented using, for example, lists, tables, unstructured data, structured data, etc. While described as being stored locally, the unstructured and/or structured data may be stored remotely, and may be distributed across any number of devices without departing from the scope of the invention.

While the database (302) has been illustrated and described as including a limited number and type of data, the database (302) may store additional, less, and/or different data without departing from the scope of the invention.

One of ordinary skill will appreciate that the database (302) may perform other functionalities without departing from the scope of the invention. When providing its functionalities, the database (302) may perform all, or a portion, of the methods illustrated in FIGS. 5.1-5.2. The database (302) may be implemented using hardware, software, or any combination thereof.

In one or more embodiments of the invention, the logger (304) may be a shared storage or memory resource (discussed above) that is functional to store unstructured and/or structured data. Further, the logger (304) may also occupy a portion of a physical storage/memory device or, alternatively, may span across multiple physical storage/memory devices.

In one or more embodiments, the logger (304) may be implemented using physical devices that provide data storage services. The devices that provide data storage services may include hardware devices and/or logical devices. For example, the logger (304) may include any quantity and/or combination of memory devices, long-term storage devices, other types of hardware devices that may provide short-term and/or long-term data storage services, and/or logical storage devices (e.g., virtual persistent storage/virtual volatile storage).

For example, the logger (304) may include a memory device (e.g., a dual in-line memory device), in which data is stored and from which copies of previously stored data are provided. As yet another example, the logger (304) may include a persistent storage device (e.g., an SSD), in which data is stored and from which copies of previously stored data is provided. As yet another example, the logger (304) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the logger (304) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or another hardware device that allocates storage resources of the physical storage devices.

In one or more embodiments, the logger (304) may store/log/record (temporarily or permanently, in conjunction with the database (302), and based on the log level configuration set by an administrator of the data cluster (e.g., 120A, FIG. 1)) unstructured and/or structured data that may include (or specify), for example (but not limited to): a valid (e.g., a granted) request and its corresponding details, an invalid (e.g., a rejected) request and its corresponding details, one or more details (e.g., content of the transmitted data packets, information regarding a targeted destination, etc.) of a recently initiated data retrieval operation, one or more details (e.g., content of the intercepted data packets, information regarding the sender (e.g., a malicious user, a high priority trusted user, a low priority trusted user, etc.), information regarding the size of intercepted data packets, etc.) of an incoming request/call/network traffic, one or more details (e.g., content of the outgoing data packets, information regarding a targeted destination, information regarding the size of outgoing data packets, etc.) of an outgoing request/call/network traffic, a mapping table that shows the mappings between an incoming request/call/network traffic and an outgoing request/call/network traffic, a data replication operation history documentation of a valid user, a data retrieval operation history documentation of a valid user, recently obtained user activity records, a cumulative history of user activity records obtained over a prolonged period of time, a cumulative history of network traffic logs obtained over a prolonged period of time, a documentation that indicates a set of jobs (e.g., a data replication job, a data retrieval job, etc.) that has been initiated, a documentation that indicates a status of a job (e.g., how many jobs are still active, how many jobs are completed, etc.), a cumulative history of initiated data replication operations (e.g., sessions) over a prolonged period of time, a cumulative history of initiated data restore operations over a prolonged period of time, a cumulative history of initiated data retrieval operations over a prolonged period of time, any changes to configuration parameters (as well as the relevant parties and information associated with such changes, in which the changes may be result of changes made by an administrator or via administrative systems), details of data objects that do not match the corresponding configuration parameters (in this manner, the logged details may be used to audit a user, incoming network traffic, and/or outgoing network traffic), one or more details of an initiated data transfer operation from the SAN infrastructure (e.g., 210, FIG. 1) to a client (e.g., 110A, 110B, etc., FIG. 1), performance metrics (e.g., discussed below in FIG. 5.1), etc.

In one or more embodiments, data logged by the logger (304) may be registered. That is, the data may be indexed or otherwise associated with registration records. A registration record may be a data structure that includes information that enables the logged data to be accessed. For example, a registration record may include an identifier associated with the data. A registration record may include different, additional, and/or less information for access the data without departing from the scope of the invention. When the logger (304) stores data in itself, the logger (304) may provide a corresponding registration record to the database (302). The database (302) may utilize the aforementioned registration record to notify other entities of the existence of the data and/or to facilitate access to the data in the future.

In one or more embodiments, the unstructured and/or structured data may be maintained by, for example, the predictor (300), the authenticator (306), and/or the traffic agent (310). The aforementioned components may add, remove, and/or modify those data in the logger (304) to cause the information included in the logger (304) to reflect the latest version of, for example, configuration parameters. The unstructured and/or structured data available in the logger (304) may be implemented using, for example, lists, tables, unstructured data, structured data, etc. While described as being stored locally, the unstructured and/or structured data may be stored remotely, and may be distributed across any number of devices without departing from the scope of the invention.

While the logger (304) has been illustrated and described as including a limited number and type of data, the logger (304) may store additional, less, and/or different data without departing from the scope of the invention.

One of ordinary skill will appreciate that the logger (304) may perform other functionalities without departing from the scope of the invention. When providing its functionalities, the logger (304) may perform all, or a portion, of the methods illustrated in FIGS. 5.1-5.2. The logger (304) may be implemented using hardware, software, or any combination thereof.

In one or more embodiments, the authenticator (306) may include the functionality to: (i) establish authenticated connections with other LMMs in other data clusters, (ii) determine whether there are currently active LMM connections, (iii) select LMMs to use to service requests based on LMM information, (iv) set LMM connections to standby, etc. One of ordinary skill will appreciate that the authenticator (306) may perform other functionalities without departing from the scope of the invention. When providing its functionalities, the authenticator (306) may perform all, or a portion, of the methods illustrated in FIGS. 5.1-5.2. The authenticator (306) may be implemented using hardware, software, or any combination thereof.

In one or more embodiments of the invention, the service agent (308) may include the functionality to manage services on the machine where it is deployed. In one or more embodiments, the service agent (308) may include functionality to manage one or more services provided by a component of the LMM (202). For example, the service agent (308) may shut down (i) one or more services/functionalities (e.g., the logging service) provided by the logger (304) and/or (ii) one or more services/functionalities (e.g., the reporting service) provided by the reporter (312) if the predictor (300), authenticator (306), or the traffic agent (310) could not perform their main services/functionalities because of a recent surge in incoming network traffic (e.g., when there is an unusually high amount of activity in the incoming network traffic).

One of ordinary skill will appreciate that the service agent (308) may perform other functionalities without departing from the scope of the invention. The service agent (308) may be implemented using hardware, software, or any combination thereof.

In one or more embodiments of the invention, the traffic agent (310) may include the functionality to process all incoming and outgoing calls (i.e., requests) to and from the SAN infrastructure of data cluster A (120A, FIG. 2).

In one or more embodiments, the traffic agent (310) may include functionality to, e.g.: (i) intercept, identify, and accept/reject (in conjunction with the authenticator (306)) a request/call/network traffic (e.g., a data retrieval request) received from an entity using an interception mechanism (i.e., the authenticator (306)), (ii) provide an additional layer of security/authentication mechanism (on top of a firewall) during any type communication/transaction/operation (e.g., a data retrieval operation from the SAN infrastructure (e.g., 210, FIG. 1) to a client (e.g., 110A, FIG. 1)) (a) for maximum data security, integrity, and availability, and (b) to prevent initiation of any invalid/bogus data replication/retrieval operation, (iii) obtain (or receive) an encrypted request and send that request to the corresponding target (e.g., the SAN infrastructure (e.g., 210, FIG. 1), other data cluster (e.g., 120B, FIG. 1) over a network (e.g., 105, FIG. 1)), (iv) based on (iii), send the encrypted request and its corresponding details (e.g., an IP address of a targeted destination and/or a port address of a target component (e.g., storage in the SAN infrastructure (e.g., 210, FIG. 1) and/or other data cluster (e.g., 120B, FIG. 1)), a client-side configuration associated with the request, information regarding data (e.g., type and/or content of data that is planned to be retrieved, a device/domain/unique identifier (IP address) of a user that wants to retrieve that data, etc.), API information of the request, a text length of the request, a request body of the request, etc.) to the logger (304), etc.

One of ordinary skill will appreciate that the traffic agent (310) may perform other functionalities without departing from the scope of the invention. When providing its functionalities, the traffic agent (310) may perform all, or a portion, of the methods illustrated in FIGS. 5.1-5.2. The traffic agent (310) may be implemented using hardware, software, or any combination thereof.

In one or more embodiments, the reporter (312) may include the functionality to provide information to users of data cluster. The reporter (312) may include the functionality to generate, populate, and modify a command-based console or user interface (e.g., a graphical user interface or a command-line interface) based on user inputs (e.g., mouse clicks, commands, etc.). The information provided to the users may include the current performance baseline data, performance metrics (discussed below), and predictions generated by the predictor. Users may be able to perform actions based on the information specified by the reporter (312) such as update hardware and/or software components of the data cluster, upgrade hardware and/or software components of the data cluster, etc. One of ordinary skill will appreciate that the reporter (312) may perform other functionalities without departing from the scope of the invention.

The reporter (312) may be implemented using hardware, software, or any combination thereof.

In one or more embodiments, the predictor (300), database (302), logger (304), authenticator (306), service agent (308), traffic agent (310), and reporter (312) may be utilized in isolation and/or in combination to provide the above-discussed functionalities. These functionalities may be invoked using any communication model including, for example, message passing, state sharing, memory sharing, etc. By doing so, the LMM (202) may address issues related to data security, integrity, and availability proactively.

Figure 4:
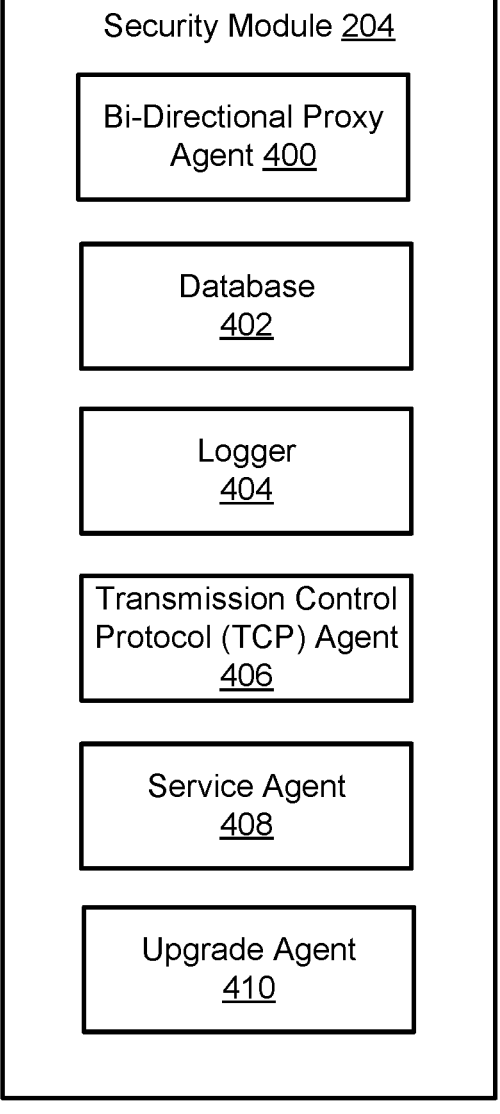
FIG. 4 shows a diagram of a security module in accordance with one or more embodiments of the invention.

Turning now to FIG. 4, FIG. 4 shows a diagram of a security module (204) in accordance with one or more embodiments of the invention. The security module (204) may be an example of the security module (204) discussed above in reference to FIG. 2. The security module (204) may include a bi-directional proxy agent (400), a database (402), a logger (404), a Transmission Control Protocol (TCP) agent (406), a service agent (408), and an upgrade agent (410). The security module (204) may include additional, fewer, and/or different components without departing from the scope of the invention. Each component may be operatively connected to any of the other component via any combination of wired and/or wireless connections. Each component illustrated in FIG. 4 is discussed below.

In one or more embodiments, the security module (204) may operate in a manner transparent (e.g., a transparent reverse proxy) to any component (e.g., a firewall (e.g., 200, FIG. 1), a SAN infrastructure (e.g., 210, FIG. 1), etc.) of a data cluster (e.g., 120A, FIG. 1) and any client (e.g., 110A, 110B, etc., FIG. 1) (or any user of that client) of that data cluster. In one or more embodiments, when any of the components of the security module (204) are down or unavailable to perform its functionalities, a second security module (deployed to the same data cluster) may continue to provide functionalities of the unavailable component.

In one or more embodiments of the invention, the bi-directional proxy agent (400) may include the functionality to process all incoming and outgoing calls (i.e., requests) to and from the SAN infrastructure of data cluster A (120A, FIG. 2).

In one or more embodiments, the bi-directional proxy agent (400) may include functionality to, e.g.: (i) intercept, identify, and pass to the TCP agent (406) a request/call/network traffic (e.g., a data retrieval request) received from an entity using an interception mechanism, (ii) provide an additional layer of security/authentication mechanism (on top of a firewall) during any type communication/transaction/operation (e.g., a data retrieval operation from the SAN infrastructure (e.g., 210, FIG. 1) to a client (e.g., 110A, FIG. 1)) (a) for maximum data security, integrity, and availability, and (b) to prevent initiation of any invalid/bogus data replication/retrieval operation, (iii) obtain (or receive) an encrypted request and send that request to the corresponding target (e.g., the SAN infrastructure (e.g., 210, FIG. 1), other data cluster (e.g., 120B, FIG. 1) over a network (e.g., 105, FIG. 1)), (iv) based on (iii), send the encrypted request and its corresponding details (e.g., an IP address of a targeted destination and/or a port address of a target component (e.g., storage in the SAN infrastructure (e.g., 210, FIG. 1) and/or other data cluster (e.g., 120B, FIG. 1)), a client-side configuration associated with the request, information regarding data (e.g., type and/or content of data that is planned to be retrieved, a device/domain/unique identifier (IP address) of a user that wants to retrieve that data, etc.), API information of the request, a text length of the request, a request body of the request, etc.) to the logger (404), etc.

One of ordinary skill will appreciate that the bi-directional proxy agent (400) may perform other functionalities without departing from the scope of the invention. When providing its functionalities, the bi-directional proxy agent (400) may perform all, or a portion, of the methods illustrated in FIGS. 6.1-6.2. The bi-directional proxy agent (400) may be implemented using hardware, software, or any combination thereof.

In one or more embodiments, the database (402) may be a fully managed, local, and lightweight database (or any logical container such as SQLite database) that acts as a shared storage or memory resource (discussed above) that is functional to store unstructured and/or structured data. Further, the database (402) may also occupy a portion of a physical storage/memory device or, alternatively, may span across multiple physical storage/memory devices.

In one or more embodiments, the database (402) may be implemented using physical devices that provide data storage services (e.g., storing data and providing copies of previously stored data). The devices that provide data storage services may include hardware devices and/or logical devices. For example, the database (402) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (402) may include a memory device (e.g., a dual in-line memory device), in which data is stored and from which copies of previously stored data are provided. As yet another example, the database (402) may include a persistent storage device (e.g., an SSD), in which data is stored and from which copies of previously stored data is provided. As yet another example, the database (402) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (402) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (402) may store (temporarily or permanently) unstructured and/or structured data that may include (or specify), for example (but not limited to): one or more configuration parameters (described below) provided/configured by an administrator of a data cluster, one or more policies/rules for the operation (or configuration) of any portion of the bi-directional proxy agent (400) and/or the TCP agent (406) (to manage security, network traffic, network access, or any other function/operation performed by the bi-directional proxy agent (400) and/or the TCP agent (406)), details of each data cluster of an organization (e.g., how many storage boxes deployed to each SAN infrastructure, information regarding the criticality of data stored in a storage box, an IP address of each component deployed to a data cluster, active/passive port numbers of each component deployed to a data cluster, a product identifier of each component deployed to a data cluster, etc.) to provide a complete data protection, integrity, and availability across those data clusters, a profile of a valid user, a profile of an invalid user, a set of SLAs (e.g., an agreement that indicates a period of time required to retain a profile of a user), recently obtained user information (e.g., records, credentials, etc.) of a user, a port's user guide, a port's release note, a user posted approximated port activation time, a model name of a hardware component, a serial number of a computing device, a hardware identification (ID) number of a hardware component, an identifier of a computing device's manufacturer, a setting of an application, a version of an application, a product identifier of an application, a hash mapping lookup table (described below), a storage location map (described below), etc.

In one or more embodiments, the configuration parameters may specify (or include), for example (but not limited to): a request ruleset; a response ruleset; one or more rules/policies for (a) what data to cache, (b) when to cache the data, (c) for whom to cache the data, and (d) when to expire an object in cache or refresh the cache; one or more rules/policies that are provided based on (i) a profile of a user, (ii) an identification of a client, (iii) a type of a network connection, (iv) a type of a SAN infrastructure, (v) contents/payloads of network traffic, etc.

In one or more embodiments, during the deployment of the security module (204), an administrator of the data cluster (e.g., 120A, FIG. 1) may directly provide the configuration parameters (which may be configured directly), or the configuration parameters may be imported by the administrator in the form of, for example, an extensible markup language (XML) file or JavaScript object notation (JSON) file.

In one or more embodiments, a request ruleset (e.g., one or more rules/configurations that allow the bi-directional proxy agent (400) to act as an inbound/incoming network traffic filter, one or more bi-directional proxy parameters, etc.) may specify (or include), for example (but not limited to): a request decryption rule, a request authentication rule (which may be utilized by the authentication agent to validate a request), a rule regarding how the bi-directional proxy agent (400) should operate, a type of an allowable network communication/protocol between an entity and the components of a data cluster, a particular header that needs to be included in an intercepted request, a smart contract that defines under what conditions a request should be accepted (e.g., granted), a smart contract that defines under what conditions a data packet should be transferred to a SAN infrastructure, one or more rules/policies for detecting and blocking illegitimate requests and application-based attacks, one or more rules/policies to protect components of a data cluster against various classes and types of Internet-based vulnerabilities (e.g., buffer overflow, common gateway interface (CGI)—Bin parameter manipulation, form/hidden filed manipulation, forceful browsing, cross-site scripting (XSS), command injection, error triggering sensitive information leak, back doors and debug options, platform or OS vulnerabilities, etc.), etc.

In one or more embodiments, the authentication related rules (e.g., a request decryption rule) included in the request ruleset may be the same across all data clusters of an organization to perform a uniform and successful authentication process.

In one or more embodiments, a response ruleset (e.g., one or more rules/configurations that allow the bi-directional proxy agent (400) to act as an outbound network traffic filter) may include (or specify), for example (but not limited to): an attribution rule (e.g., a type/format of an asset (e.g., a ".pdf"

file, a ".doc" file, a "jpeg" file, etc.), a size of an asset, a content of an asset (e.g., a legal document, an engineering design document, etc.), an identifier of an asset, etc.), an asset sensitivity/criticality threshold that needs to be applied for all outgoing network traffic, etc.

In one or more embodiments, the authentication related rules included in the response ruleset may be the same across all data clusters of an organization to perform a uniform and successful authentication process.

In one or more embodiments, the database (402) may provide an indexing service. More specifically, an agent of the database (402) may receive various data authentication related inputs directly from, for example, the bi-directional proxy agent (400) or the TCP agent (406). Upon receiving, the agent may analyze those inputs to generate an index(es) (e.g., a data authentication index(es)) for optimizing the performance of the database (402) by reducing a required amount of database access(es) when implementing a request (e.g., a data retrieval request). In this manner, requested data may be quickly located and accessed from the database (402) using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

Further, in one or more embodiments, an index may include, for example (but not limited to) information about a valid user associated with a data retrieval operation. The index(es) may also include other information that may be used to efficiently identify historical data retrieval operations. In one or more embodiments, the aforementioned data may be stored as "data retrieval operation metadata" in the database (402), in which the corresponding data may be retrieved from a storage box of a SAN infrastructure (e.g., 210, FIG. 1).

In one or more embodiments, the unstructured and/or structured data may be updated (automatically) by third party systems (e.g., platforms, marketplaces, etc.) (provided by vendors) or by administrators based on, for example, newer (e.g., updated) versions of configuration parameters being available. The unstructured and/or structured data may also be updated when, for example (but not limited to): a different type of attack is captured for data access, a new response ruleset is generated, a new request ruleset is generated, etc.

In one or more embodiments, the unstructured and/or structured data may be maintained by, for example, the bi-directional proxy agent (400), the TCP agent (406), the logger (404), and the upgrade agent (410). The aforementioned components may add, remove, and/or modify those data in the database (402) to cause the information included in the database (402) to reflect the latest version of, for example, configuration parameters. The unstructured and/or structured data available in the database (402) may be implemented using, for example, lists, tables, unstructured data, structured data, etc. While described as being stored locally, the unstructured and/or structured data may be stored remotely, and may be distributed across any number of devices without departing from the scope of the invention.

While the database (402) has been illustrated and described as including a limited number and type of data, the database (402) may store additional, less, and/or different data without departing from the scope of the invention.

One of ordinary skill will appreciate that the database (402) may perform other functionalities without departing from the scope of the invention. When providing its functionalities, the database (402) may perform all, or a portion, of the methods illustrated in FIGS. 6.1-6.2. The database (402) may be implemented using hardware, software, or any combination thereof.

In one or more embodiments, the logger (404) may be a shared storage or memory resource (discussed above) that is functional to store unstructured and/or structured data. Further, the logger (404) may also occupy a portion of a physical storage/memory device or, alternatively, may span across multiple physical storage/memory devices.

In one or more embodiments, the logger (404) may be implemented using physical devices that provide data storage services. The devices that provide data storage services may include hardware devices and/or logical devices. For example, the logger (404) may include any quantity and/or combination of memory devices, long-term storage devices, other types of hardware devices that may provide short-term and/or long-term data storage services, and/or logical storage devices (e.g., virtual persistent storage/virtual volatile storage).

For example, the logger (404) may include a memory device (e.g., a dual in-line memory device), in which data is stored and from which copies of previously stored data are provided. As yet another example, the logger (404) may include a persistent storage device (e.g., an SSD), in which data is stored and from which copies of previously stored data is provided. As yet another example, the logger (404) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the logger (404) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or another hardware device that allocates storage resources of the physical storage devices.

In one or more embodiments, the logger (404) may store/log/record (temporarily or permanently, in conjunction with the database (402), and based on the log level configuration set by an administrator of the data cluster (e.g., 120A, FIG. 1)) unstructured and/or structured data that may include (or specify), for example (but not limited to): a valid (e.g., a granted) request and its corresponding details, an invalid (e.g., a rejected) request and its corresponding details, one or more details (e.g., content of the transmitted data packets, information regarding a targeted destination, etc.) of a recently initiated data retrieval operation, one or more details (e.g., content of the intercepted data packets, information regarding the sender (e.g., a malicious user, a high priority trusted user, a low priority trusted user, etc.), information regarding the size of intercepted data packets, etc.) of an incoming request/call/network traffic, one or more details (e.g., content of the outgoing data packets, information regarding a targeted destination, information regarding the size of outgoing data packets, etc.) of an outgoing request/call/network traffic, a mapping table that shows the mappings between an incoming request/call/network traffic and an outgoing request/call/network traffic, a data replication operation history documentation of a valid user, a data retrieval operation history documentation of a valid user, recently obtained user activity records, a cumulative history of user activity records obtained over a prolonged period of time, a cumulative history of network traffic logs obtained over a prolonged period of time, a documentation that indicates a set of jobs (e.g., a data replication job, a data retrieval job, etc.) that has been initiated, a documentation that indicates a status of a job (e.g., how many jobs are still active, how many jobs are completed, etc.), a cumulative history of initiated data replication operations (e.g., sessions) over a prolonged period of time, a cumulative history of initiated data restore operations over a prolonged period of time, a cumulative history of initiated data retrieval operations over a prolonged period of time, any changes to configuration parameters (as well as the relevant parties and information associated with such changes, in which the changes may be result of changes made by an administrator or via administrative systems), details of data objects that do not match the corresponding configuration parameters (in this manner, the logged details may be used to audit a user, incoming network traffic, and/or outgoing network traffic), one or more details of an initiated data transfer operation from the SAN infrastructure (e.g., 210, FIG. 1) to a client (e.g., 110A, 110B, etc., FIG. 1), performance metrics (e.g., discussed below in FIG. 5.1), etc.

In one or more embodiments, data logged by the logger (404) may be registered. That is, the data may be indexed or otherwise associated with registration records. A registration record may be a data structure that includes information that enables the logged data to be accessed. For example, a registration record may include an identifier associated with the data. A registration record may include different, additional, and/or less information for access the data without departing from the scope of the invention. When the logger (404) stores data in itself, the logger (404) may provide a corresponding registration record to the database (402). The database (402) may utilize the aforementioned registration record to notify other entities of the existence of the data and/or to facilitate access to the data in the future.

In one or more embodiments, the unstructured and/or structured data may be maintained by, for example, the bi-directional proxy agent (400), the TCP agent (406), and/or the upgrade agent (410). The aforementioned components may add, remove, and/or modify those data in the logger (404) to cause the information included in the logger (404) to reflect the latest version of, for example, configuration parameters. The unstructured and/or structured data available in the logger (404) may be implemented using, for example, lists, tables, unstructured data, structured data, etc. While described as being stored locally, the unstructured and/or structured data may be stored remotely, and may be distributed across any number of devices without departing from the scope of the invention.

While the logger (404) has been illustrated and described as including a limited number and type of data, the logger (404) may store additional, less, and/or different data without departing from the scope of the invention.

One of ordinary skill will appreciate that the logger (404) may perform other functionalities without departing from the scope of the invention. When providing its functionalities, the logger (404) may perform all, or a portion, of the methods illustrated in FIGS. 6.1-6.2. The logger (404) may be implemented using hardware, software, or any combination thereof.

In one or more embodiments of the invention, the TCP agent (406) may include the functionality to: (i) analyze requests from clients obtained from the bi-directional proxy agent (400), (ii) determine whether the requests are valid and accept or reject requests accordingly, (iii) generate tokens for new sessions, (iv) terminate sessions, etc. One of ordinary skill will appreciate that the authenticator (306) may perform other functionalities without departing from the scope of the invention. When providing its functionalities, the TCP agent (406) may perform all, or a portion, of the methods illustrated in FIGS. 6.1-6.2. The TCP agent (406) may be implemented using hardware, software, or any combination thereof.

In one or more embodiments of the invention, the service agent (408) may include the functionality to manage services on the machine where it is deployed. In one or more embodiments, the service agent (408) may include functionality to manage one or more services provided by a component of the security module (204). For example, the service agent (408) may shut down (i) one or more services/functionalities (e.g., the logging service) provided by the logger (404) and/or (ii) one or more services/functionalities (e.g., the upgrade service) provided by the upgrade agent (410) if the bi-directional proxy agent (400) or the TCP agent (406) could not perform their main services/functionalities because of a recent surge in incoming network traffic (e.g., when there is an unusually high amount of activity in the incoming network traffic).

One of ordinary skill will appreciate that the service agent (408) may perform other functionalities without departing from the scope of the invention. The service agent (408) may be implemented using hardware, software, or any combination thereof.

In one or more embodiments of the invention, the upgrade agent (410) may include the functionality to process all incoming and outgoing calls (i.e., requests) to and from the SAN infrastructure of data cluster A (120A, FIG. 2).

In one or more embodiments, the upgrade agent (410) may include functionality to, e.g.: (i) perform periodic checks with vendors to upgrade one or more data cluster components, (ii) receives and performs upgrades of components, (iii), etc. One of ordinary skill will appreciate that the upgrade agent (410) may perform other functionalities without departing from the scope of the invention. The upgrade agent (410) may be implemented using hardware, software, or any combination thereof.

In one or more embodiments, the bi-directional proxy agent (400), database (402), logger (404), TCP agent (406), service agent (408), and upgrade agent (410) may be utilized in isolation and/or in combination to provide the above-discussed functionalities.

These functionalities may be invoked using any communication model including, for example, message passing, state sharing, memory sharing, etc. By doing so, the security module (204) may address issues related to data security, integrity, and availability proactively.

FIG. 5.1 shows a flowchart of a method for performing load management services in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

The method shown in FIG. 5.1 may be executed by, for example, the above-discussed load management module (LMM) (e.g., 202, FIG. 2). Other components of the system (100) illustrated in FIGS. 1-4 may also execute all or part of the method shown in FIG. 5.1 without departing from the scope of the invention.

In Step 500, a load performance decline event is identified. In one or more embodiments, the LMM may monitor the incoming requests to the in which the LMM resides. The LMM may also continually or periodically monitor and generate performance metrics associated with servicing the requests within the data cluster. In other embodiments, the LMM may otherwise obtain (e.g., from other entities of the data cluster or operatively connected to the data cluster such as servers, network device, SAN infrastructure, etc.) the performance metrics. The performance metrics may include, for example, processor and/or processes performance metrics, memory performance metrics, storage performance metrics, network and input/output (IO) performance metrics. The performance metrics may be host level performance metrics (e.g., associated with a particular service and its components) and/or VM level performance metrics (e.g., associated with a particular VM, hypervisor, etc.). The performance metrics may also include storage solution metrics such as RAID or logical unit number (LUN) failures. The performance metrics may include other and/or additional types of performance metrics without departing from embodiments of the invention. Each of the aforementioned performance metrics are discussed below in more detail.

In one or more embodiments, the processor and processes metrics may include, for example, the processor latency, cycles per instruction, instruction throughput, instructions per second, processor temperature, number of processes executing and/or waiting to be executed by the processor, and/or processor load percentage. The processor and processes performance metrics may include other and/or additional metrics associated with processor performance without departing from the invention.

In one or more embodiments, the memory performance metrics may include, for example, memory utilization, access time, transfer rate, cycle time, faults per second, memory capacity, memory writes per second, and/or memory reads per second. The memory performance metrics may include other and/or additional metrics associated with memory without departing from the invention.

In one or more embodiments, the storage performance metrics may include, for example, storage capacity, storage utilization, storage throughput, storage input/output operations per second (IOPS), storage latency, mean time failures, and total terabytes written over time. The storage performance metrics may include other and/or additional metrics associated with storage (physical or virtual) without departing from the invention.

In one or more embodiments, the network and IO performance metrics may include, for example, network bandwidth (e.g., bytes per second, kilobytes per second, megabytes per second, etc.), network throughput, network latency, network jitter, packet loss, bandwidth-delay product, and network load. The network and IO performance metrics may include other and/or additional metrics associated with network and IO performance without departing from the invention.

Turning back to Step 500, in one or more embodiments, the LMM may compare the current performance metrics with performance baseline data. The performance baseline data may include performance metric thresholds that specify maximum and/or minimum performance metric values. The LMM may identify one or more current performance metrics that violate (e.g., more than or less than) corresponding performance metric thresholds as a performance baseline data violation. In one or more embodiments, the LMM may identify the performance baseline data violation as the load performance decline event.

In one or more embodiments, the LMM may generate predictions specifying future points in time in which a performance baseline data violation will occur using a prediction model, the performance baseline data, and the current performance metrics. In one or more embodiments, the prediction model may be generated using a self-learning machine learning algorithm. The prediction model may be generated using other and/or additional types machine learning algorithms without departing from embodiments disclosed herein. In one or more embodiments, the LMM may identify the occurrence of a point in time specified by a prediction of a future performance baseline data violation as the load performance decline event. The load performance decline event may be identified via other and/or additional methods without departing from embodiments disclosed herein.

In Step 502, a determination is made as to whether there are currently active LMM connections. In one or more embodiments, the database of the LMM may include a list of active secure string identifiers and corresponding authenticated connections with other LMMs executing in other data clusters. In one or more embodiments, the LMM may check the list of active secure string identifiers to determine whether there are any currently active LMM connections. In one or more embodiments of the invention, if there are no secure string identifiers included in list of active secure string identifiers, then the LMM determines that there are no currently active LMM connections. In one or more embodiments of the invention, if there are secure string identifiers included in list of active secure string identifiers, then the LMM determines that there are currently active LMM connections. In one or more embodiments, the determination as to whether there are currently active LMM connections may be made via other and/or additional methods without departing from embodiments of the invention.

In one or more embodiments of the invention, if it is determined that there is a currently active LMM connection, then the method proceeds to Step 506. In one or more embodiments of the invention, if it is determined that there are not currently active LMM connections, then the method proceeds to Step 504.

In Step 504, authenticated connection is established with other LMMs using a secure string identifier. For additional information regarding establishing an authenticated connection with other LMMs using a secure string identifier, refer to FIG. 5.2.

In Step 506, an LMM is selected to service requests based on LMM information. As discussed above, the database of the LMM may include a list of the active active secure string identifiers and corresponding authenticated connections with other LMMs executing in other data clusters. The list may further specify the LMM identifiers and/or the data cluster identifier associated with each secure string identifier. In one or more embodiments, if all data clusters are replicas of each other, then the LMM may randomly select an LMM associated with a data cluster included in the list that is associated with an available secure string identifier. In other embodiments, the database may further include LMM information that may include configuration parameters and connection bandwidth associated with each LMM and corresponding data cluster for which there is an active connection. The LMM may select an LMM of a data cluster associated with the highest connection bandwidth, or with a bandwidth connection above a threshold set by a user, that includes matching or similar (e.g., by performing similarity calculations) configuration parameters to the data cluster of the LMM that is performing the selection. The LMM may be selected to service request based on LMM information via other and/or additional methods without departing from embodiments disclosed herein.

In Step 508, requests are sent to the data cluster associated with the selected LMM using a secure string identifier associated with the selected LMM. In one or more embodiments, the LMM may forward a newly obtained request to the selected LMM of another data cluster. The LMM may use the authenticated connection to forward the newly obtained request. In one or more embodiments, the LMM may encrypt the secure string identifier associated with connected LMM and the static alphanumeric key and include the encrypted secure string identifier and the static alphanumeric key in the obtained request. The LMM may use any appropriate method for data encryption (e.g., 128-bit encryption) without departing from embodiments of the invention. The LMM may then forward the newly obtained request to the selected LMM and the corresponding data cluster. The selected LMM may then service the forwarded request using the data cluster associated with the selected LMM. Newly obtained requests may continually be sent to the selected LMM using the secure string identifier as long as the data cluster performance metrics are below the performance baseline data and the secure string identifies has not expired (e.g., see Steps 510 and 518 respectively). Requests may be sent to the data cluster associated with the selected LMM using a secure string identifier associated with the selected LMM via other and/or additional methods without departing from embodiments of the invention.

In Step 510, a determination is made as to whether load performance is restored. In one or more embodiments, the LMM may continually compare the current performance metrics with performance baseline data. As discussed above, the performance baseline data may include performance metric thresholds that specify maximum and/or minimum performance metric values. The LMM may check to see if one or more of current performance metrics continue to violate (e.g., be more than or less than) corresponding performance metric thresholds of the performance baseline to determine whether the load performance of the data cluster is restored. In one or more embodiments of the invention, if one or more of the current performance metrics continue to violate corresponding performance metric thresholds of the performance baseline data, then the LMM determines that the load performance is not restored. In one or more embodiments of the invention, if none (or less than a user configurable threshold) of the current performance metrics continue to violate corresponding performance metric thresholds of the performance baseline data, then the LMM determines that the load performance is restored. The determination as to whether the load performance is restored may be determined via other and/or additional methods without departing from embodiments disclosed herein.

In one or more embodiments of the invention, if it is determined that the load performance is restored, then the method proceeds to Step 512. In one or more embodiments of the invention, if it is determined that the load performance is not restored, then the method proceeds to Step 518.

In Step 512, the LMM connection is set to standby. In one or more embodiments, the LMM sets the LMM connection to standby. The LMM may send a notification, API call, or other message to the other LMM associated with the LMM connection to indicate that the connection is set to standby and no more requests will be sent in the near future. The LMM connection may be set to standby via other and/or additional methods without departing from embodiments disclosed herein.

In Step 514, service requests. The data cluster may be manually restored or automatically restored using any appropriate method of data cluster restoration without departing from embodiments of the invention. As a result, the data cluster may now be available to service requests. In one or more embodiments, as a result of the data cluster performance restoration, the LMM may service requests using the restored data cluster and its components.

In Step 516, performance metrics associated with servicing the requests are logged in a database. In one or more embodiments, the LMM may log the performance metrics associated with servicing the requests by the data cluster in the database as the requests are being processed. The LMM may also log the requests serviced and the request response time associated with the requests. The LMM may also log or obtain (from other LMMs) and store information associated with requests forwarded to other LMMs. Such information may include a request identifier, the LMM identifier and data cluster identifier to which the request was forwarded, etc. Other and/or additional information associated with servicing requests may be logged in the database without departing from the invention. Performance metrics associated with servicing the requests may be logged in the database via other and/or additional methods without departing from embodiments disclosed herein.

In one or more embodiments of the invention, the method ends following Step 516.

In Step 518, a determination is made as to whether the LMM connection has expired. As discussed above, each secure string identifier may be associated with an expiration timeframe after which the secure string identifier is deemed expired and is no longer valid. The expiration timeframe may specify a window of time (e.g., a day, an hour, a week) since the secure string identifier is created after which the secure sting identifier is expired. In other embodiments, the expiration timeframe may specify a number of requests that may be forwarded to other LMMs using the secure string identifier after which the secure string identifier is expired. The expiration timeframe associated with each active secure string identifier may be stored in the database of the LMM. In one or more embodiments, the LMM may check the expiration timeframe associated with the secure string identifier corresponding to the LMM connection to determine whether the LMM connection has expired. In one or more embodiments of the invention, if the expiration timeframe has completely passed or occurred, then the LMM determines that the LMM connection has expired. In one or more embodiments of the invention, if the expiration timeframe has not completely passed or occurred, then the LMM determines that the LMM connection has not expired.

In one or more embodiments of the invention, if it is determined that the LMM connection has expired, then the method proceeds to Step 502. In one or more embodiments of the invention, if it is determined that the LMM connection has not expired, then the method proceeds to Step 508.

FIG. 5.2 shows a flowchart of a method for establishing an authenticated connection in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

The method shown in FIG. 5.2 may be executed by, for example, the above-discussed load management module (LMM) (e.g., 202, FIG. 2). Other components of the system (100) illustrated in FIGS. 1-4 may also execute all or part of the method shown in FIG. 5.2 without departing from the scope of the invention.

In Step 520, another LMM is identified based on the LMM information. In one or more embodiments, the database may include a list of LMMs executing on other data clusters in the system. In one or more embodiments, if all data clusters are replicas of each other, then the LMM may randomly identify an LMM associated with a data cluster included in the list that is associated with an available secure string identifier. In other embodiments, the database may further include LMM information that may include configuration parameters and connection bandwidth associated with each LMM and corresponding data cluster in the system. The LMM may identify an LMM of a data cluster associated with the highest connection bandwidth, or with a bandwidth connection above a threshold set by a user, that includes matching or similar (e.g., by performing similarity calculations) configuration parameters to the data cluster of the LMM that is performing the selection. The LMM may be identified based on LMM information via other and/or additional methods without departing from embodiments disclosed herein.

In Step 522, current time is converted to Coordinated Universal Time (UTC). In one or more embodiments, the LMM identifies the current time in the time zone associated with the geographic location of the data cluster in which the LMM is executing. The LMM may then convert the current time to UTC using any appropriate method for converting local time to UTC without departing from embodiments disclosed herein. As a result, the current system time may be uniform across geographies spanning multiple time zones. The current time may be converted to UTC via other and/or additional methods without departing from embodiments disclosed herein.

In Step 524, a secure string identifier is generated based on the UTC and a secure string parameter. In one or more embodiments, the LMM may generate a secure string identifier using current time in UTC and a secure string parameter. In one or more embodiments, the secure string parameter may be a unique combination of alphanumeric characters configured by a user of the system and stored in the database (e.g., a username and/or a password). The secure string parameter may include any quantity and/or combination of alphanumeric characters without departing from embodiments disclosed herein. In one or more embodiments, the LMM may generate the secure string identifier using the UTC and the secure string parameter using any appropriate method of secure string generation without departing from embodiments disclosed herein. For example, the LMM may merge the UTC with the secure string parameter, apply the UTC and the secure string parameter to a cryptographic hash function to generate the secure string identifier, etc. The secure string identifier may be generated based on the current UTC and the secure string parameter via other and/or additional methods without departing from embodiments disclosed herein.

In Step 526, the secure string identifier and a static alphanumeric key are encrypted. In one or more embodiments, the LMM encrypts the secure string identifier and a static alphanumeric key. The static alphanumeric key may be a unique combination of alphanumeric characters associated with the LMM. Each LMM may be associated with a different static alphanumeric key. The static alphanumeric key may include any quantity and/or combination of alpha-numeric characters without departing from embodiments disclosed herein. The LMM may use any appropriate method of encryption to encrypt the secure string identifier and the static alphanumeric key without departing from embodiments disclosed herein. For example, the LMM may use 208-bit encryption to encrypt the secure string identifier and the static alphanumeric key. The secure string identifier and a static alphanumeric key may be encrypted via other and/or additional methods without departing from embodiments disclosed herein.

In Step 528, a connection notification is sent to the LMM that includes the encrypted secure string identifier and the static alphanumeric key. In one or more embodiments, the LMM sends a connection notification to the other identified LMM that includes the encrypted secure string identifier and the static alphanumeric key. The connection notification may be sent to the other identified LMM using any appropriate method for data transmission without departing from embodiments disclosed herein. For example, the LMM may send the connection notification to the other identified LMM as a message including one or more network packets through one or more network devices that operatively connect the LMM and the other identified LMM. The connection noti-fication that includes the encrypted secure string identifier and the static alphanumeric key may sent to the other identified LMM via other and/or additional methods without departing from embodiments disclosed herein.

In Step 530, a connection notification response is obtained from the LMM. In one or more embodiments, the other LMM decrypts the secure string identifier and the static alphanumeric key included in the connection notification upon receipt of the connection notification. The other LMM may then verify that the static alphanumeric key matches the stored alphanumeric key associated with the LMM to con-firm that the connection notification originated from one of the LMMs in the system and not a malicious entity. The other LMM may encrypt and include the secure string identifier and its own static alphanumeric in all responses and/or requests sent to the LMM through the authenticated connection. As a result, in one or more embodiments, the LMM may obtain a connection notification response from the other LMM. The connection notification response may include the encrypted secure string identifier and the encrypted static alphanumeric key associated with the other LMM. The connection notification response may be sent to the LMM using any appropriate method for data transmis-sion without departing from embodiments disclosed herein. For example, the LMM may send the connection notification to the other identified LMM as a message including one or more network packets through one or more network devices that operatively connect the LMM and the other identified LMM. The connection notification response may be obtained from the other identified LMM via other and/or additional methods without departing from embodiments disclosed herein.

In one or more embodiments of the invention, the method ends following Step 530.

FIG. 6.1 shows a flowchart of a method for establishing a secure session in accordance with one or more embodi-ments of the invention. While various steps in the method are presented and described sequentially, those skilled in the art will appreciate that some or all of the steps may be executed in different orders, may be combined or omitted, and some or all steps may be executed in parallel without departing from the scope of the invention.

The method shown in FIG. 6.1 may be executed by, for example, the above-discussed security module (e.g., 204, FIG. 2). Other components of the system (100) illustrated in FIGS. 1-4 may also execute all or part of the method shown in FIG. 6.1 without departing from the scope of the inven-tion.

In Step 600, a session registration request is obtained from a client. In one or more embodiments, the security module obtains a session registration request from the client. The session registration request may be sent to the security module using any appropriate method of data transmission without departing from embodiments of the invention. For example, the client may send the session registration request to the security module as a message including one or more network packets through one or more network devices that operatively connect the client and the security module. The session registration request may be obtained from the client via other and/or additional methods without departing from embodiments disclosed herein.

In Step 602, a random alphanumeric value is generated. In one or more embodiments, the security module may gener-ate the random alphanumeric value. In one or more embodi-ments, the security module may generate the random alpha-numeric value using a cryptographic level pseudo random number generation algorithm. Other and/or additional ran-dom alphanumeric generation algorithms may be used to generate the random alphanumeric value without departing from embodiments disclosed herein. The random alphanu-meric value may include any combination and/or quantity of alphanumeric characters without departing from embodi-ments disclosed herein. The random alphanumeric value may be generated via other and/or additional methods with-out departing from embodiments disclosed herein.

In Step 604, the current timestamp is converted to Coor-dinated Universal Time (UTC). In one or more embodi-ments, the security module may identify the current time in the time zone associated with the geographic location of the data cluster in which the security module is executing. The security module may then convert the current time to UTC using any appropriate method for converting local time to UTC without departing from embodiments disclosed herein. As a result, the current system time may be uniform across geographies spanning multiple time zones. The current time may be converted to UTC via other and/or additional methods without departing from embodiments disclosed herein.

In Step 606, a static parameter associated with the client is obtained. In one or more embodiments, the security module may obtain a static parameter associated with the client. The static parameter may be included in the session registration request obtain in Step 600. Accordingly, the security module may parse the session registration request to obtain the static parameter. In other embodiments, the client or a user of the client may have provided the static parameter to the security module prior to sending the session registra-tion request. In such a scenario, the security module may obtain the static parameter from the database. In one or more embodiments, the static parameter may be a unique combi-nation of alphanumeric characters associated with a client and/or a user of a client (e.g., a username and/or a pass-word). The static parameter may include any combination and/or quantities of alphanumeric characters without depart-ing from embodiments disclosed herein. The static param-eter associated with the client may be obtained via other and/or additional methods without departing from embodi-ments disclosed herein.

In Step 608, a token is generated using the random alphanumeric value, the UTC timestamp, and the static parameter. In one or more embodiments, the security module may generate the token using random alphanumeric value, current time in UTC, and a static parameter. The token may be, for example, cross-site request forgery (CSRF) token. In one or more embodiments, the security module may generate the token using the using the random alphanumeric value, the UTC timestamp, and the static parameter using any appropriate method of token generation without departing from embodiments disclosed herein. For example, the LMM may merge the random alphanumeric value, the UTC, and the static parameter, apply the random alphanumeric value, the UTC, and the static parameter to a CSRF generation algorithm to generate the token, apply the random alphanumeric value, the UTC, and the static parameter to a cryptographic hash function to generate the token, etc. The token may be generated using the random alphanumeric value, the UTC timestamp, and the static parameter via other and/or additional methods without departing from embodiments disclosed herein.

In Step 610, session parameters are generated and stored in the database. In one or more embodiments, the security module generates the session parameters associated with the session registration request. The session parameters may include a session identifier assigned to the session by the security module, a session timeout that specifies a point in time after which the session should be terminated, and a status indicator (e.g., a flag, a bit, a tag, etc.). The status indicator may indicate whether the associated session is active or terminated. The security module may also include a copy of the token in the session parameters. The session parameters may include other and/or additional information associated with the session without departing from embodiments disclosed herein. The security module may store the session parameters in the database. The session parameters may be generated and stored in the database via other and/or additional methods without departing from embodiments disclosed herein.

In Step 612, a session registration acknowledgement is sent to the client. In one or more embodiments, the security module may send a request that includes or otherwise acts as a session registration acknowledgement to the client. In one or more embodiments, the security module may include the token in the body of the request to increase the difficulty of malicious access of the token. The session registration acknowledgement may be sent to the client using any appropriate method of data transmission without departing from embodiments of the invention. For example, the security module may send the session registration acknowledgement to the client as a message including one or more network packets through one or more network devices that operatively connect the client and the security module. The session registration acknowledgement may be sent to the client via other and/or additional methods without departing from embodiments disclosed herein.

In Step 614, a determination is made as to whether session termination is required. In one or more embodiments, the security module may monitor the session parameters. In one or more embodiments, the security module may monitor the current time and the session timeout. In one or more embodiments, the security module may compare the current time and the session timeout to determine whether a session termination is required. In one or more embodiments of the invention, if the current time matches or is later than the session timeout, then the security module may determine that session termination is required. In one or more embodiments of the invention, if the current time is earlier than the session timeout, then the security module determines that session termination is not required. In other embodiments, the client may send a request to terminate the session. In one or more embodiments of the invention, if the security module obtains a request to terminate the session from the client, then the security module determines that session termination is required. In one or more embodiments of the invention, if the security module does not obtain a request to terminate the session from the client, then the security module determines that session termination is not required. The determination as to whether session termination is required may be made via other and/or additional methods without departing from embodiments disclosed herein.

In one or more embodiments of the invention, if it is determined that session termination is required, then the method proceeds to Step 618. In one or more embodiments of the invention, if it is determined that session termination is not required, then the method proceeds to Step 614.

In Step 616, session information is logged in the database. In one or more embodiments, the security may monitor the session while it is active. Upon termination, the security module may generate the total time in which the session was active (e.g., the starting timestamp and the terminating timestamp), the number of requests received during the session, and other and/or additional information associated with the session, and session requests without departing from embodiments disclosed herein. The security module may store the logged session information in the database and include the session information with the session parameters associated with the session. The session information may be logged in the database via other and/or additional methods without departing from embodiments disclosed herein.

In Step 618, the session is terminated. In one or more embodiments, the security module may terminate the session with the client and update the status indicator associated with the session to indicate that the session is terminated. The security module may also terminate any other information associated with the session (e.g., a cookie). The session may be terminated via other and/or additional methods without departing from embodiments disclosed herein.

In one or more embodiments of the invention, the method ends following Step 618.

FIG. 6.2 shows a flowchart of a method for verifying a request in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

The method shown in FIG. 6.2 may be executed by, for example, the above-discussed security module (e.g., 204, FIG. 2). Other components of the system (100) illustrated in FIGS. 1-4 may also execute all or part of the method shown in FIG. 6.2 without departing from the scope of the invention.

In Step 630, a request is obtained from a client. In one or more embodiments, the security module may obtain a request from the client. The request may be sent to the security module using any appropriate method of data transmission without departing from embodiments of the invention. For example, the client may send the request to the security module as a message including one or more network packets through one or more network devices that operatively connect the client and the security module. The request may be obtained from the client via other and/or additional methods without departing from embodiments disclosed herein.

In Step 632, a determination is made as to whether any structural abnormalities are detected in the request. In one or more embodiments, the security module may perform one or more request structure verifications to determine whether any structural abnormalities are detected in the request. The request structure verifications may include: (i) verifying that Transport Layer Security (TLS) is used on the request, (ii) verifying header flags and header fields with their corresponding sizes, (iii) verifying the relevance of code bits data (e.g., [SYN, ACK, FIN, PSH, RST, URG]), (iv) verifying the reserved field and checksum size, (v) verifying packet data against windows size field (e.g., flow control), (vi) filtering data with urgent flag, (vii) validating the token is present in the request, and/or (viii) validating that the session identifier is present in the request. The security module may determine whether each of the aforementioned request structure verifications was a success or failed. In one or more embodiments of the invention, if the security module determines that one of the request structure verifications fail, then the security module determines that there is a structural abnormality detected in the request. In one or more embodiments of the invention, if the security module determines that none of the request structure verifications fails, then the security module determines that there is not a structural abnormality detected in the request. The determination as to whether any structural abnormalities are detected in the request may be made via other and/or additional methods without departing from embodiments of the invention.

In one or more embodiments of the invention, if it is determined that there is a structural abnormality, then the method proceeds to Step 642. In one or more embodiments of the invention, if it is determined that there is not a structural abnormality, then the method proceeds to Step 634.

In Step 634, a determination is made as to whether there is a valid session identifier. In one or more embodiments, the security module may compare the session identifier included in the request with the session identifiers included in the database. If the session identifier included in the request matches a session identifier included in the database, the security module then checks the status indicator associated with the session identifier. In one or more embodiments of the invention, if the session identifier included in the request matches a session identifier included in the database and the associated status indicator indicates that the session is active, then the security module determines that there is a valid session identifier in the request. In one or more embodiments of the invention, if the session identifier included in the request does not match a session identifier included in the database or the associated status indicator indicates that the session is terminated, then the security module determines that there is not a valid session identifier in the request. The determination as to whether there is a valid session identifier in the request may be made via other and/or additional methods without departing from embodiments disclosed herein.

In one or more embodiments of the invention, if it is determined that there is a valid session identifier, then the method proceeds to Step 636. In one or more embodiments of the invention, if it is determined that there is not a valid session identifier, then the method proceeds to Step 642.

In Step 636, a determination is made as to whether there is a valid token. As discussed above, the security module may match the session identifier in the request with a session identifier included in the database. In one or more embodiments, the security module may then compare the token in the request with the token in the database that is associated with the session identifier. In one or more embodiments of the invention, if the token in the request matches the token in the database that is associated with the session identifier, then the security module determines that there is a valid token in the request. In one or more embodiments of the invention, if the token in the request does not match the token in the database that is associated with the session identifier, then the security module determines that there is a valid token in the request. The determination as to whether there is a valid token may be made via other and/or additional methods without departing from embodiments disclosed herein.

In one or more embodiments of the invention, if it is determined that there is a valid token, then the method proceeds to Step 638. In one or more embodiments of the invention, if it is determined that there is not a valid token, then the method proceeds to Step 636.

In Step 638, the request is serviced. After verifying that the request is legitimate and not malicious, the security module may service requests using the restored data cluster and its components. As a result, the security module may pass the request to backend services of the SAN to service the request (e.g., write data, modify data, read data, etc.). The request may be serviced via other and/or additional methods without departing from embodiments disclosed herein.

In Step 640, the request is logged in the database. In one or more embodiments, the security module may log the request in the database. The security module may generate or otherwise assign a request identifier to the request, log the point in time in which the request is obtained, log the client or entity from which the request originated, and/or indicate that the request was accepted and serviced. The security module may log other and/or additional information associated with the request without departing from embodiments disclosed herein. The request may be logged in the database via other and/or additional methods without departing from embodiments disclosed herein.

In one or more embodiments of the invention, the method ends following Step 640.

In Step 642, the request is rejected. In one or more embodiments, the security module may discard, delete, ignore, or otherwise reject the request. The security module may send a request rejection error notification to the client or other entity from which the request originated. The request may be rejected via other and/or additional methods without departing from embodiments disclosed herein.

In Step 644, the rejected request is logged in the database. In one or more embodiments, the security module may log the rejected request in the database. The security module may generate or otherwise assign a request identifier to the request, log the point in time in which the request is obtained, log the client or entity from which the request originated, and/or indicate that the request was rejected. The security module may log other and/or additional information associated with the rejected request without departing from embodiments disclosed herein. The rejected request may be logged in the database via other and/or additional methods without departing from embodiments disclosed herein.

In one or more embodiments of the invention, the method ends following Step 644.

Figure 7:
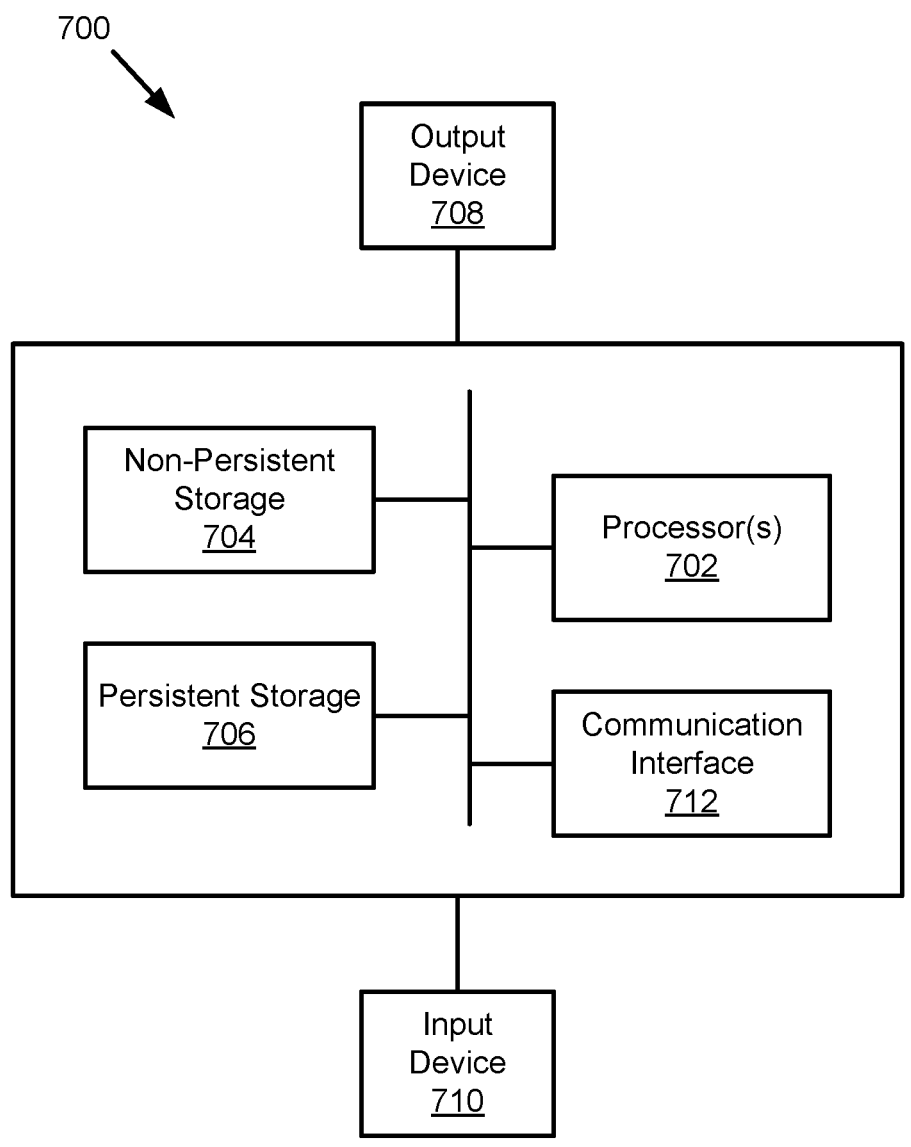
FIG. 7 shows a diagram of a computing device in accordance with one or more embodiments of the invention.

Turning now to FIG. 7, FIG. 7 shows a diagram of a computing device in accordance with one or more embodiments of the invention.

In one or more embodiments of the invention, the computing device (700) may include one or more computer processors (702), non-persistent storage (704) (e.g., volatile memory, such as RAM, cache memory), persistent storage (706) (e.g., a hard disk, an optical drive such as a CD drive or a DVD drive, a Flash memory, etc.), a communication interface (712) (e.g., Bluetooth interface, infrared interface, network interface, optical interface, etc.), an input device(s) (710), an output device(s) (708), and numerous other elements (not shown) and functionalities. Each of these components is described below.

In one or more embodiments, the computer processor(s) (702) may be an integrated circuit for processing instructions. For example, the computer processor(s) (702) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (e.g., a LAN, a WAN, Internet, mobile network, etc.) and/or to another device, such as another computing device.

In one or more embodiments, the computing device (700) may include one or more output devices (708), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing loads in data clusters, comprising:

identifying, by a first load management module (LMM) of a first data cluster, a load performance decline event associated with the first data cluster;

in response to identifying the load performance decline event:

making a first determination that there are no active authenticated connections between the first LMM of the first data cluster and any other LMM executing on any other data cluster;

in response to the first determination:

accessing, from a database of the first data cluster, LMM information, wherein the LMM information comprises configuration parameters and connection bandwidths associated with other LMMs executing in other data clusters;

identifying a second LMM of a second data cluster using the LMM information, wherein identifying the second LMM comprises selecting the second LMM whose configuration parameters match a similarity threshold relative to configuration parameters of the first LMM;

converting current system time to coordinated universal time (UTC);

generating a secure string identifier using a current UTC time and a secure string parameter;

encrypting the secure string identifier and a static alphanumeric key;

establishing an authenticated connection using the encrypted secure string identifier and the static alphanumeric key;

sending requests to the second LMM over the authenticated connection using the secure string identifier, wherein the second LMM services the requests using the second data cluster;

making a second determination that load performance of the first data cluster is restored;

in response to the second determination:

setting the authenticated connection to standby; and servicing second requests using the first data cluster.

2. The method of claim 1, wherein the secure string identifier is associated with an expiration timeframe specified by the secure string parameters.

3. The method of claim 2, wherein the method further comprises:

after setting the authenticated connection to standby:

identifying the expiration of the secure string identifier based on the expiration timeframe; and terminating the authenticated connection.

4. The method of claim 1, wherein the load performance decline event comprises determining current data cluster performance metrics are below a baseline.

5. The method of claim 1, wherein the load performance decline event comprises identifying an occurrence of a predicted data cluster load performance decline window.

6. A method for managing loads in data clusters, comprising:

identifying, by a first load management module (LMM) of a first data cluster, a load performance decline event associated with the first data cluster;

in response to identifying the load performance decline event:

selecting a second LMM of a second data cluster, wherein the second LMM is associated with an authenticated connection with the first LMM, wherein selecting the second LMM of the second data cluster comprises:

making a first determination that there are no active authenticated connections between the first LMM of the first data cluster and any other LMM executing on any other data cluster;

in response to the first determination:

accessing, from a database of the first data cluster, LMM information, wherein the LMM information comprises configuration parameters and connection bandwidths associated with other LMMs executing in other data clusters;

identifying the second LMM using the LMM information, wherein identifying the second LMM comprises selecting the second LMM whose configuration parameters match a similarity threshold relative to configuration parameters of the first LMM;

converting current system time to coordinated universal time (UTC);

generating a secure string identifier using a current UTC time and secure string parameters;

encrypting the secure string identifier and a static alphanumeric key;

establishing the authenticated connection using the encrypted secure string identifier and the static alphanumeric key;

sending requests to the second LMM using a secure string identifier associated with the authenticated connection, wherein the second LMM services the requests using the second data cluster;

making a second determination that load performance of the first data cluster is restored;

in response to the second determination:

setting the authenticated connection to standby; and servicing second requests using the first data cluster.

7. The method of claim 6, wherein the secure string identifier is associated with an expiration timeframe specified by the secure string parameters.

8. The method of claim 7, wherein the method further comprises:

after sending the requests to the second LMM:

identifying the expiration of the secure string identifier based on the expiration timeframe; and terminating the authenticated connection.

9. The method of claim 6, wherein the load performance decline event comprises identifying current data cluster performance metrics are below a baseline.

10. The method of claim 6, wherein the load performance decline event comprises identifying an occurrence of a predicted data cluster load performance decline window.

11. The method of claim 10, wherein the predicted data cluster load performance decline window is generated using:

a prediction model;

current data cluster performance metrics;

current request information; and baseline data.

12. The method of claim 11, wherein the predicted data cluster load performance decline window specifies a predicted future timeframe that the performance metrics will be below baseline data.

13. A non-transitory computer readable medium comprising computer readable program code, which when executed by a computer processor enables the computer processor to perform a method for managing loads in data clusters, the method comprising:

identifying, by a first load management module (LMM) of a first data cluster, a load performance decline event associated with the first data cluster;

in response to identifying the load performance decline event:

selecting a second LMM associated with a second data cluster, wherein the second LMM is associated with an authenticated connection with the first LMM, wherein selecting the second LMM of the second data cluster comprises:

making a first determination that there are no active authenticated connections between the first LMM of the first data cluster and any other LMM executing on any other data cluster;

in response to the first determination:

accessing, from a database of the first data cluster, LMM information, wherein the LMM information comprises configuration parameters and connection bandwidths associated with other LMMs executing in other data clusters;

identifying the second LMM using the LMM information, wherein identifying the second LMM comprises selecting the second LMM whose configuration parameters match a similarity threshold relative to configuration parameters of the first LMM;

converting current system time to coordinated universal time (UTC);

generating a secure string identifier using a current UTC time and secure string parameters;

encrypting the secure string identifier and a static alphanumeric key;

establishing the authenticated connection using the encrypted secure string identifier and the static alphanumeric key;

sending requests to the second LMM using a secure string identifier associated with the authenticated connection, wherein the second LMM services the requests using the second data cluster;

making a second determination that load performance of the first data cluster is restored;

in response to the second determination:

setting the authenticated connection to standby; and servicing second requests using the first data cluster.

14. The non-transitory computer readable medium of claim 13, wherein the secure string identifier is associated with an expiration timeframe specified by the secure string parameters.

15. The non-transitory computer readable medium of claim 14, wherein the method further comprises:

after sending the requests to the second LMM:

identifying the expiration of the secure string identifier based on the expiration timeframe; and terminating the authenticated connection.

16. The non-transitory computer readable medium of claim 13, wherein the load performance decline event comprises identifying current data cluster performance information below a baseline.

\* \* \* \* \*